(12) United States Patent
Zhao et al.

(10) Patent No.: US 12,189,088 B2
(45) Date of Patent: Jan. 7, 2025

(54) OPTICAL IMAGING LENS ASSEMBLY

(71) Applicant: ZHEJIANG SUNNY OPTICS CO., LTD., Zhejiang (CN)

(72) Inventors: Yikun Zhao, Zhejiang (CN); Yu Zhou, Zhejiang (CN); Fujian Dai, Zhejiang (CN); Liefeng Zhao, Zhejiang (CN)

(73) Assignee: ZHEJIANG SUNNY OPTICS CO., LTD., Zhejiang (CN)

( * ) Notice: Subject to any disclaimer, the term of this patent is extended or adjusted under 35 U.S.C. 154(b) by 489 days.

(21) Appl. No.: 17/517,697

(22) Filed: Nov. 3, 2021

(65) Prior Publication Data
US 2022/0137368 A1    May 5, 2022

(30) Foreign Application Priority Data
Nov. 3, 2020    (CN) .......................... 202011208665.3

(51) Int. Cl.
G02B 13/00    (2006.01)
G02B 9/64    (2006.01)
G02B 27/00    (2006.01)

(52) U.S. Cl.
CPC ........... *G02B 13/0045* (2013.01); *G02B 9/64* (2013.01); *G02B 27/0025* (2013.01)

(58) Field of Classification Search
CPC .................. G02B 13/0045; G02B 9/64; G02B 27/0025; G02B 13/18
USPC .................................................. 359/642, 708
See application file for complete search history.

(56) References Cited

U.S. PATENT DOCUMENTS

2020/0393653 A1* 12/2020 Chen ........................ G02B 9/64

FOREIGN PATENT DOCUMENTS

CN    212623295 U  *  2/2021

* cited by examiner

*Primary Examiner* — Tuyen Tra
(74) *Attorney, Agent, or Firm* — Samson G. Yu

(57) ABSTRACT

The disclosure provides an optical imaging lens assembly, which sequentially includes, from an object side to an image side along an optical axis: a first lens, a second lens, a third lens, a fourth lens, a fifth lens, a sixth lens, a seventh lens and an eighth lens with refractive power respectively. Each of the fourth lens, the fifth lens and the sixth lens has negative refractive power. A total effective focal length f of the optical imaging lens assembly satisfies f>7.5 mm. A curvature radius R11 of an object-side surface of the sixth lens, a curvature radius R12 of an image-side surface of the sixth lens, a refractive index N6 of the sixth lens and an abbe number V6 of the sixth lens satisfy $1.0 \text{ mm}^{-1} < V6/(R11+R12 \times N6) < 2.0 \text{ mm}^{-1}$.

19 Claims, 15 Drawing Sheets longitudinal aberration curve (millimeter)

OPTICAL IMAGING LENS ASSEMBLY

CROSS-REFERENCE TO RELATED PRESENT INVENTION(S)

The disclosure claims priority to and the benefit of Chinese Patent Present invention No. 202011208665.3, filed in the China National Intellectual Property Administration (CNIPA) on 3 Nov. 2020, which is incorporated herein by reference in its entirety.

TECHNICAL FIELD

The disclosure relates to the technical field of optical elements, and more particularly to an optical imaging lens assembly.

BACKGROUND

In recent years, with the rapid development of the industry of portable electronic products such as smart phones, resolutions of rear cameras used for portable electronic products such as smart phones have also been continuously upgraded. Meanwhile, providers of smart phones and the like have made increasing requirements to resolutions of optical imaging lens assemblies applied to smart phones. It can thus be seen that optical imaging lens assembly with the characteristic of high resolution will become a main development trend in the future field of optical imaging lens assemblies.

SUMMARY

An embodiment of the disclosure provides an optical imaging lens assembly, which sequentially includes from an object side to an image side along an optical axis: a first lens, a second lens, a third lens, a fourth lens, a fifth lens, a sixth lens, a seventh lens and an eighth lens with refractive power respectively, wherein each of the fourth lens, the fifth lens and the sixth lens has negative refractive power; a total effective focal length f of the optical imaging lens assembly may satisfy f>7.5 mm; and a curvature radius R11 of an object-side surface of the sixth lens, a curvature radius R12 of an image-side surface of the sixth lens, a refractive index N6 of the sixth lens and an abbe number V6 of the sixth lens may satisfy 1.0 mm$^{-1}$<V6/(R11+R12×N6)<2.0 mm$^{-1}$.

In an implementation mode, an object-side surface of the first lens to an image-side surface of the eighth lens includes at least one aspheric mirror surface.

In an implementation mode, an effective focal length f1 of the first lens and an effective focal length f6 of the sixth lens may satisfy −5.0<f6/f1<−1.0.

In an implementation mode, the total effective focal length f of the optical imaging lens assembly and an effective focal length f7 of the seventh lens may satisfy 1.0<f/f7<2.0.

In an implementation mode, the total effective focal length f of the optical imaging lens assembly and an effective focal length f8 of the eighth lens may satisfy −1.5<f/f8<−1.0.

In an implementation mode, a curvature radius R1 of an object-side surface of the first lens and a curvature radius R2 of an image-side surface of the first lens may satisfy 4.0<R2/R1<5.0.

In an implementation mode, a curvature radius R3 of an object-side surface of the second lens, a curvature radius R4 of an image-side surface of the second lens and an abbe number V3 of the third lens may satisfy 1.0 mm$^{-1}$<V3/(R3+R4)<2.0 mm$^{-1}$.

In an implementation mode, a curvature radius R9 of an object-side surface of the fifth lens, a curvature radius R10 of an image-side surface of the fifth lens and an Abbe number V5 of the fifth lens may satisfy 1.0 mm<(R9+R10)/V5<1.5 mm.

In an implementation mode, a curvature radius R13 of an object-side surface of the seventh lens and a curvature radius R14 of an image-side surface of the seventh lens may satisfy 2.0<(R14+R13)/(R14−R13)<3.0.

In an implementation mode, a curvature radius R15 of an object-side surface of the eighth lens and a curvature radius R16 of an image-side surface of the eighth lens may satisfy −2.5<R15/R16<−1.0.

In an implementation mode, a spacing distance T23 of the second lens and the third lens on the optical axis and a spacing distance T67 of the sixth lens and the seventh lens on the optical axis may satisfy T23>T67.

In an implementation mode, a spacing distance T45 of the fourth lens and the fifth lens on the optical axis and a spacing distance T78 of the seventh lens and the eighth lens on the optical axis may satisfy 2.0<T78/T45<3.6.

In an implementation mode, a center thickness CT1 of the first lens on the optical axis and a center thickness CT8 of the eighth lens on the optical axis may satisfy 1.0<CT1/CT8<2.0.

In an implementation mode, ImgH is a half of a diagonal length of an effective pixel region on an imaging surface of the optical imaging lens assembly, and ImgH and the total effective focal length f of the optical imaging lens assembly may satisfy 1.0<f/ImgH<1.5.

In an implementation mode, a spacing distance T78 of the seventh lens and the eighth lens on the optical axis and a spacing distance T67 of the sixth lens and the seventh lens on the optical axis may satisfy 3.96≤T78/T67≤4.31.

In an implementation mode, a spacing distance T78 of the seventh lens and the eighth lens on the optical axis and a center thickness CT8 of the eighth lens on the optical axis may satisfy 1.91≤T78/CT8≤2.40.

In an implementation mode, a center thickness CT1 of the first lens on the optical axis and a spacing distance T12 of the first lens and the second lens on the optical axis may satisfy 8.17≤CT1/T12≤9.69.

Another embodiment of the disclosure provides an optical imaging lens assembly, which sequentially includes from an object side to an image side along an optical axis: a first lens, a second lens, a third lens, a fourth lens, a fifth lens, a sixth lens, a seventh lens and an eighth lens with refractive power respectively, wherein each of the fourth lens, the fifth lens and the sixth lens has negative refractive power; a total effective focal length f of the optical imaging lens assembly may satisfy f>7.5 mm; and a curvature radius R3 of an object-side surface of the second lens, a curvature radius R4 of an image-side surface of the second lens and an abbe number V3 of the third lens may satisfy 1.0 mm$^{-1}$<V3/(R3+R4)<2.0 mm$^{-1}$.

In an implementation mode, an effective focal length f1 of the first lens and an effective focal length f6 of the sixth lens may satisfy −5.0<f6/f1<−1.0.

In an implementation mode, the total effective focal length f of the optical imaging lens assembly and an effective focal length f7 of the seventh lens may satisfy 1.0<f/f7<2.0.

In an implementation mode, the total effective focal length f of the optical imaging lens assembly and an effective focal length f8 of the eighth lens may satisfy $-1.5 < f/f8 < -1.0$.

In an implementation mode, a curvature radius R1 of an object-side surface of the first lens and a curvature radius R2 of an image-side surface of the first lens may satisfy $4.0 < R2/R1 < 5.0$.

In an implementation mode, a curvature radius R9 of an object-side surface of the fifth lens, a curvature radius R10 of an image-side surface of the fifth lens and an abbe number V5 of the fifth lens may satisfy $1.0 \text{ mm} < (R9+R10)/V5 < 1.5 \text{ mm}$.

In an implementation mode, a curvature radius R13 of an object-side surface of the seventh lens and a curvature radius R14 of an image-side surface of the seventh lens may satisfy $2.0 < (R14+R13)/(R14-R13) < 3.0$.

In an implementation mode, a curvature radius R15 of an object-side surface of the eighth lens and a curvature radius R16 of an image-side surface of the eighth lens may satisfy $-2.5 < R15/R16 < -1.0$.

In an implementation mode, a spacing distance T23 of the second lens and the third lens on the optical axis and a spacing distance T67 of the sixth lens and the seventh lens on the optical axis may satisfy $T23 > T67$.

In an implementation mode, a spacing distance T45 of the fourth lens and the fifth lens on the optical axis and a spacing distance T78 of the seventh lens and the eighth lens on the optical axis may satisfy $2.0 < T78/T45 < 3.6$.

In an implementation mode, a center thickness CT1 of the first lens on the optical axis and a center thickness CT8 of the eighth lens on the optical axis may satisfy $1.0 < CT1/CT8 < 2.0$.

In an implementation mode, a curvature radius R11 of an object-side surface of the sixth lens, a curvature radius R12 of an image-side surface of the sixth lens, a refractive index N6 of the sixth lens and an abbe number V6 of the sixth lens may satisfy $1.0 \text{ mm}^{-1} < V6/(R11+R12 \times N6) < 2.0 \text{ mm}^{-1}$.

In an implementation mode, ImgH is a half of a diagonal length of an effective pixel region on an imaging surface of the optical imaging lens assembly, and ImgH and the total effective focal length f of the optical imaging lens assembly may satisfy $1.0 < f/ImgH < 1.5$.

In an implementation mode, a spacing distance T78 of the seventh lens and the eighth lens on the optical axis and a spacing distance T67 of the sixth lens and the seventh lens on the optical axis may satisfy $3.96 \leq T78/T67 \leq 4.31$.

In an implementation mode, a spacing distance T78 of the seventh lens and the eighth lens on the optical axis and a center thickness CT8 of the eighth lens on the optical axis may satisfy $1.91 \leq T78/CT8 \leq 2.40$.

In an implementation mode, a center thickness CT1 of the first lens on the optical axis and a spacing distance T12 of the first lens and the second lens on the optical axis may satisfy $8.17 \leq CT1/T12 \leq 9.69$.

According to the disclosure, the refractive power is configured reasonably, and optical parameters are optimized, so that the provided optical imaging lens assembly is applicable to a portable electronic product and has the characteristics of high resolution, large image surface, small size and high imaging quality.

BRIEF DESCRIPTION OF THE DRAWINGS

Detailed descriptions made to unrestrictive embodiments with reference to the following drawings are read to make the other characteristics, purposes and advantages of the disclosure more apparent.

DETAILED DESCRIPTION OF THE EMBODIMENTS

Figure 1:
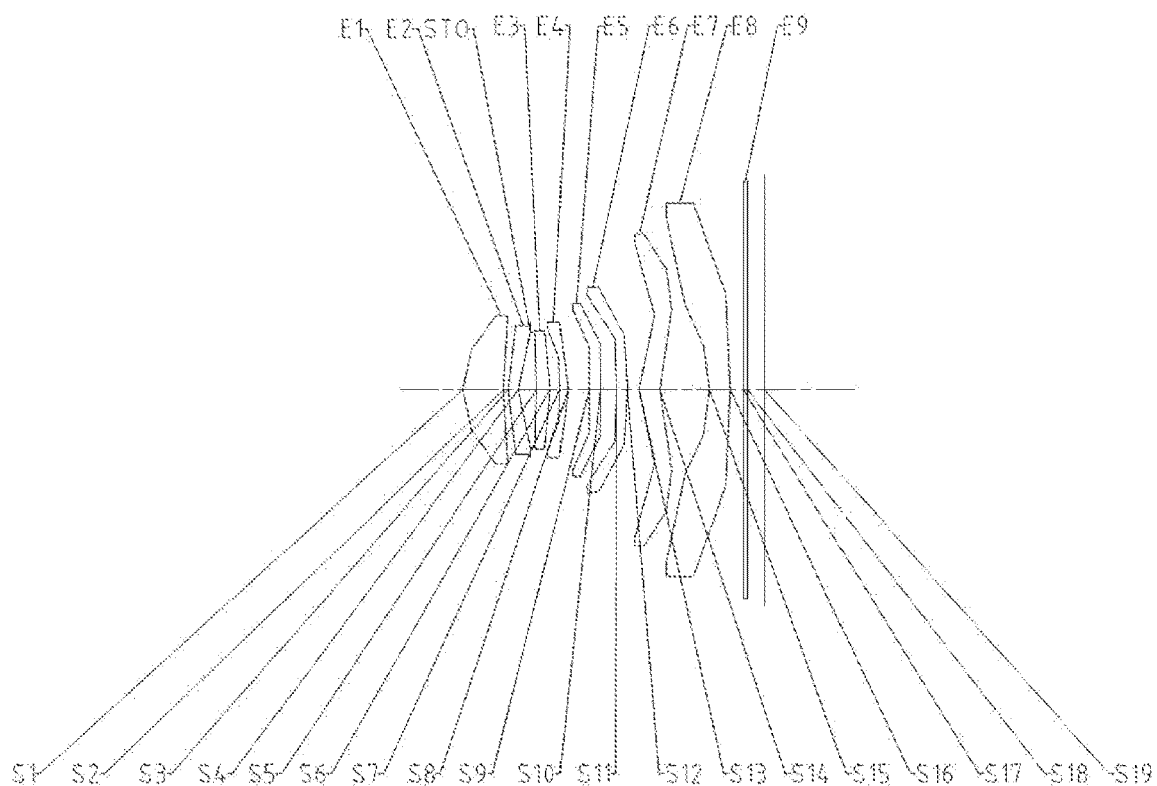
FIG. 1 shows a structural schematic diagram of an optical imaging lens assembly according to Embodiment 1 of the disclosure.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, and the like are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or aspheric shape shown in the drawings is shown by some embodiments. That is, the spherical shape or the aspheric shape is not limited to the spherical shape or aspheric shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if a lens surface is a concave surface and a position of the concave surface is not defined, it indicates that the lens surface is a concave surface at least in the paraxial region. A surface, closest to a shot object, of each lens is called an object-side surface of the lens, and a surface, closest to an imaging surface, of each lens is called an image-side surface of the lens.

It should also be understood that terms "include", "including", "have", "contain", and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings as commonly understood by those of ordinary skill in the art of the disclosure. It should also be understood that the terms (for example, terms defined in a common dictionary) should be explained to have meanings consistent with the meanings in the context of a related art and may not be explained with ideal or excessively formal meanings, unless clearly defined like this in the disclosure.

It is to be noted that the embodiments in the disclosure and characteristics in the embodiments may be combined without conflicts. The disclosure will be described below with reference to the drawings and in combination with the embodiments in detail.

The features, principles, and other aspects of the disclosure will be described below in detail.

An optical imaging lens assembly according to an exemplary embodiment of the disclosure may include eight lenses with refractive power, i.e., a first lens, a second lens, a third lens, a fourth lens, a fifth lens, a sixth lens, a seventh lens, and an eighth lens respectively. The eight lenses are sequentially arranged from an object side to an image side along an optical axis. There may be a spacing distance between any two adjacent lenses in the first lens to the eighth lens.

In the exemplary embodiment, the first lens may have a positive refractive power or a negative refractive power. The second lens may have a positive refractive power or a negative refractive power. The third lens may have a positive refractive power or a negative refractive power. The fourth lens may have a negative refractive power. The fifth lens may have a negative refractive power. The sixth lens may have a negative refractive power. The seventh lens may have a positive refractive power or a negative refractive power. The eighth lens may have a positive refractive power or a negative refractive power. Each of the fourth lens, the fifth lens and the sixth lens has negative refractive power, so that the optical imaging lens assembly may achieve an imaging effect of large image surface, and is further endowed with relatively high optical performance and machinability.

In the exemplary embodiment, the optical imaging lens assembly according to the disclosure may satisfy $-5.0 < f6/f1 < -1.0$, wherein f1 is an effective focal length of the first lens, and f6 is an effective focal length of the sixth lens. More specifically, f6 and f1 may further satisfy $-4.6 < f6/f1 < -1.4$. Satisfying $-5.0 < f6/f1 < -1.0$ is favorable for balancing an aberration of the optical imaging lens assembly better and improving the resolving power of the lens.

In the exemplary embodiment, the optical imaging lens assembly according to the disclosure may satisfy $1.0 < f/f7 < 2.0$, wherein f is a total effective focal length of the optical imaging lens assembly, and f7 is an effective focal length of the seventh lens. More specifically, f and f7 may further satisfy $1.0 < f/f7 < 1.6$. Satisfying $1.0 < f/f7 < 2.0$ may avoid light being deflected excessively, and meanwhile, effectively reduce the aberration of the optical imaging lens assembly.

In the exemplary embodiment, the optical imaging lens assembly according to the disclosure may satisfy $-1.5 < f/f8 < -1.0$, wherein f is the total effective focal length of the optical imaging lens assembly, and f8 is an effective focal length of the eighth lens. Satisfying $-1.5 < f/f8 < -1.0$ is favorable for balancing the aberration of the optical imaging lens assembly better and improving the resolving power of the lens.

In the exemplary embodiment, the optical imaging lens assembly according to the disclosure may satisfy $4.0 < R2/R1 < 5.0$, wherein R1 is a curvature radius of an object-side surface of the first lens, and R2 is a curvature radius of an image-side surface of the first lens. More specifically, R2 and R1 may further satisfy $4.3 < R2/R1 < 4.7$. Satisfying $4.0 < R2/R1 < 5.0$ is favorable for reducing the sensitivity of the lens and achieving the characteristics of large image surface and high resolving power, and meanwhile, may ensure high machinability of the first lens.

In the exemplary embodiment, the optical imaging lens assembly according to the disclosure may satisfy $1.0\ \text{mm}^{-1} < V3/(R3+R4) < 2.0\ \text{mm}^{-1}$, wherein R3 is a curvature radius of an object-side surface of the second lens, R4 is a curvature radius of an image-side surface of the second lens, and V3 is an abbe number of the third lens. More specifically, V3, R3 and R4 may further satisfy $1.4\ \text{mm}^{-1} < V3/(R3+R4) < 1.9\ \text{mm}^{-1}$. Satisfying $1.0\ \text{mm}^{-1} < V3/(R3+R4) < 2.0\ \text{mm}^{-1}$ is favorable for reducing or eliminating chromatic aberrations generated by the second lens and the third lens to achieve relatively high imaging quality of the lens.

In the exemplary embodiment, the optical imaging lens assembly according to the disclosure may satisfy $1.0\ \text{mm} < (R9+R10)/V5 < 1.5\ \text{mm}$, wherein R9 is a curvature radius of an object-side surface of the fifth lens, R10 is a curvature radius of an image-side surface of the fifth lens, and V5 is an abbe number of the fifth lens. More specifically, R9, R10 and V5 may further satisfy $1.1\ \text{mm} < (R9+R10)/V5 < 1.4\ \text{mm}$. Satisfying $1.0\ \text{mm} < (R9+R10)/V5 < 1.5\ \text{mm}$ is favorable for reducing or eliminating a chromatic aberration generated by the fifth lens to achieve relatively high imaging quality of the lens.

In the exemplary embodiment, the optical imaging lens assembly according to the disclosure may satisfy $1.0\ \text{mm}^{-1} < V6/(R11+R12 \times N6) < 2.0\ \text{mm}^{-1}$, wherein R11 is a curvature radius of an object-side surface of the sixth lens, R12 is a curvature radius of an image-side surface of the sixth lens, N6 is a refractive index of the sixth lens, and V6 is an abbe number of the sixth lens. More specifically, V6, R11, R12 and N6 may further satisfy $1.4\ \text{mm}^{-1} < V6/(R11+R12 \times N6) < 2.0\ \text{mm}^{-1}$. Satisfying $1.0\ \text{mm}^{-1} < V6/(R11+R12 \times N6) < 2.0\ \text{mm}'$ is favorable for reducing or eliminating a chromatic aberration generated by the sixth lens to achieve relatively high imaging quality of the lens.

In the exemplary embodiment, the optical imaging lens assembly according to the disclosure may satisfy $2.0<(R14+R13)/(R14-R13)<3.0$, wherein R13 is a curvature radius of an object-side surface of the seventh lens, and R14 is a curvature radius of an image-side surface of the seventh lens. More specifically, R13 and R14 may further satisfy $2.0<(R14+R13)/(R14-R13)<2.8$. Satisfying $2.0<(R14+R13)/(R14-R13)<3.0$ may avoid the seventh lens being bent excessively and reduce difficulties in machining, and meanwhile, is favorable for endowing the optical imaging lens assembly with a capability of balancing chromatic aberrations and distortions well.

In the exemplary embodiment, the optical imaging lens assembly according to the disclosure may satisfy $-2.5<R15/R16<-1.0$, wherein R15 is a curvature radius of an object-side surface of the eighth lens, and R16 is a curvature radius of an image-side surface of the eighth lens. More specifically, R15 and R16 may further satisfy $-2.4<R15/R16<-1.2$. Satisfying $-2.5<R15/R16<-1.0$ may reduce a ghost image formed by total reflection in the eighth lens.

In the exemplary embodiment, the optical imaging lens assembly according to the disclosure may satisfy T23>T67, wherein T23 is a spacing distance of the second lens and the third lens on the optical axis, and T67 is a spacing distance of the sixth lens and the seventh lens on the optical axis. More specifically, T23 may satisfy 0.45 mm<T23<0.56 mm, and T67 may satisfy 0.33 mm<T67<0.40 mm. Satisfying T23>T67 is favorable for reducing the deflection degree of light and the sensitivity, and meanwhile, may ensure the imaging quality of the optical imaging lens assembly.

In the exemplary embodiment, the optical imaging lens assembly according to the disclosure may satisfy $2.0<T78/T45<3.6$, wherein T45 is a spacing distance of the fourth lens and the fifth lens on the optical axis, and T78 is a spacing distance of the seventh lens and the eighth lens on the optical axis. More specifically, T78 and T45 may further satisfy $2.3<T78/T45<3.6$. Satisfying $2.0<T78/T45<3.6$ may ensure the machining and assembling characteristics of the lens assembly and solve the problems of interferences between previous and next lenses during assembling due to excessively small gaps, etc., and meanwhile, is favorable for reducing light deflection, adjusting a field curvature of the optical imaging lens assembly and reducing the sensitivity to further achieve higher imaging quality of the lens.

In the exemplary embodiment, the optical imaging lens assembly according to the disclosure may satisfy $1.0<CT1/CT8<2.0$, wherein CT1 is a center thickness of the first lens on the optical axis, and CT8 is a center thickness of the eighth lens on the optical axis. More specifically, CT1 and CT8 may further satisfy $1.3<CT1/CT8<2.0$. Satisfying $1.0<CT1/CT8<2.0$ is favorable for ensuring the forming characteristic of each lens by full use of an effective space in the optical imaging lens assembly.

In the exemplary embodiment, the optical imaging lens assembly according to the disclosure may satisfy $1.0<f/ImgH<1.5$, wherein ImgH is a half of a diagonal length of an effective pixel region on an imaging surface of the optical imaging lens assembly, and f is the total effective focal length of the optical imaging lens assembly. More specifically, f and ImgH may further satisfy $1.1<f/ImgH<1.3$. Satisfying $1.0<f/ImgH<1.5$ is favorable for achieving the characteristics of small size, large image surface, etc.

In the exemplary embodiment, the optical imaging lens assembly according to the disclosure may satisfy $3.96 \leq T78/T67 \leq 4.31$, wherein T78 is the spacing distance of the seventh lens and the eighth lens on the optical axis, and T67 is a spacing distance of the sixth lens and the seventh lens on the optical axis. More specifically, T78 and T67 may further satisfy $3.96 \leq T78/T67 \leq 4.31$. Satisfying $2.38 \leq T78/T67 \leq 3.50$ may balance a field curvature generated by a previous lens and a field curvature generated by a next lens in the lens system to make reasonable a field curvature of the lens.

In the exemplary embodiment, the optical imaging lens assembly according to the disclosure may satisfy $1.91 \leq T78/CT8 \leq 2.40$, wherein T78 is the spacing distance of the seventh lens and the eighth lens on the optical axis, and CT8 is a center thickness of the eighth lens on the optical axis. Satisfying $1.91 \leq T78/CT8 \leq 2.40$ may ensure the machining and assembling characteristics and solve the problems of interferences between previous and next lenses during assembling due to excessively small gaps, etc., and meanwhile, is favorable for reducing light deflection, adjusting a field curvature of the optical imaging lens assembly and reducing the sensitivity to further achieve higher imaging quality.

In the exemplary embodiment, the optical imaging lens assembly according to the disclosure may satisfy $8.17 \leq CT1/T12 \leq 9.69$, wherein CT1 is the center thickness of the first lens on the optical axis, and T12 is a spacing distance of the first lens and the second lens on the optical axis. Satisfying $8.17 \leq CT1/T12 \leq 9.69$ may effectively reduce the size of the optical imaging lens assembly to avoid the condition that the optical imaging lens assembly is oversized, meanwhile, reduce difficulties in assembling of the lenses, and achieve a relatively high space utilization rate.

In the exemplary embodiment, the optical imaging lens assembly according to the disclosure further includes a diaphragm arranged at the image-side surface of the second lens. Optionally, the optical imaging lens assembly may further include an optical filter configured to correct the chromatic aberration and/or a protective glass configured to protect a photosensitive element on the imaging surface. The disclosure discloses an optical imaging lens assembly with the characteristics of small size, large image surface, high resolution, high imaging quality, etc. The optical imaging lens assembly according to the embodiment of the disclosure may adopt multiple lenses, for example, the above-mentioned eight. The refractive power and surface types of each lens, the center thickness of each lens, on-axis spacing distances between the lenses and the like may be reasonably configured to effectively converge incident light, reduce a total track length of the imaging lens assembly, improve the machinability of the imaging lens assembly and ensure that the optical imaging lens assembly is more favorable for production and machining.

In the embodiment of the disclosure, at least one of mirror surfaces of each lens is an aspheric mirror surface, namely at least one mirror surface in an object-side surface of the first lens to an image-side surface of the eighth lens is an aspheric mirror surface. An aspheric lens has a characteristic that a curvature keeps changing from a center of the lens to a periphery of the lens. Unlike a spherical lens with a constant curvature from a center of the lens to a periphery of the lens, the aspheric lens has a better curvature radius characteristic and the advantages of improving distortions and improving astigmatic aberrations. With the adoption of the aspheric lens, astigmatism aberrations during imaging may be eliminated as much as possible, thereby improving the imaging quality. In an embodiment, at least one of the object-side surface and image-side surface of each lens in the first lens, the second lens, the third lens, the fourth lens, the fifth lens, the sixth lens, the seventh lens and the eighth lens is an aspheric mirror surface. In another embodiment, both the object-side surface and the image-side surface of each lens in the first lens, the second lens, the third lens, the fourth lens, the fifth lens, the sixth lens, the seventh lens and the eighth lens are aspheric mirror surfaces.

However, those skilled in the art should know that the number of the lenses forming the optical imaging lens assembly may be changed without departing from the technical solutions claimed in the disclosure to achieve each result and advantage described in the specification. For example, although descriptions are made in the embodiment with eight lenses as an example, the optical imaging lens assembly is not limited to eight lenses. If necessary, the optical imaging lens assembly may further include another number of lenses.

Specific embodiments applied to the optical imaging lens assembly of the above-mentioned embodiments will further be described below with reference to the drawings.

Embodiment 1

An optical imaging lens assembly according to Embodiment 1 of the disclosure will be described below with reference to FIGS. 1-2D. FIG. 1 shows a structural schematic diagram of an optical imaging lens assembly according to Embodiment 1 of the disclosure.

As shown in FIG. 1, the optical imaging lens assembly sequentially includes, from an object side to an image side, a first lens E1, a second lens E2, a diaphragm STO, a third lens E3, a fourth lens E4, a fifth lens E5, a sixth lens E6, a seventh lens E7, an eighth lens E8, an optical filter E9 and an imaging surface S19.

The first lens E1 has a positive refractive power, an object-side surface S1 thereof is a convex surface, and an image-side surface S2 thereof is a concave surface. The second lens E2 has a negative refractive power, an object-side surface S3 thereof is a convex surface, and an image-side surface S4 thereof is a concave surface. The third lens E3 has a positive refractive power, an object-side surface S5 thereof is a concave surface, and an image-side surface S6 thereof is a convex surface. The fourth lens E4 has a negative refractive power, an object-side surface S7 thereof is a convex surface, and an image-side surface S8 thereof is a concave surface. The fifth lens E5 has a negative refractive power, an object-side surface S9 thereof is a convex surface, and an image-side surface S10 thereof is a concave surface. The sixth lens E6 has a negative refractive power, an object-side surface S11 thereof is a convex surface, and an image-side surface S12 thereof is a concave surface. The seventh lens E7 has a positive refractive power, an object-side surface S13 thereof is a convex surface, and an image-side surface S14 thereof is a concave surface. The eighth lens E8 has a negative refractive power, an object-side surface S15 thereof is a concave surface, and an image-side surface S16 thereof is a concave surface. The optical filter E9 has an object-side surface S17 and an image-side surface S18. Light from an object sequentially penetrates through each of the surfaces S1 to S18 and is finally imaged on the imaging surface S19.

Table 1 shows a basic parameter table of the optical imaging lens assembly of Embodiment 1, wherein the units of the curvature radius, the thickness/distance and the focal length are all millimeters (mm).

TABLE 1

| Surface number | Surface type | Curvature radius | Thickness/distance | Material Refractive index | Abbe number | Focal length | Conic coefficient |
|---|---|---|---|---|---|---|---|
| OBJ | Spherical | Infinite | Infinite | | | | |
| S1 | Aspheric | 2.9746 | 1.2319 | 1.55 | 56.1 | 6.68 | −0.9862 |
| S2 | Aspheric | 13.7407 | 0.1423 | | | | 22.6971 |
| S3 | Aspheric | 9.3488 | 0.3133 | 1.68 | 19.2 | −17.68 | 17.8449 |
| S4(STO) | Aspheric | 5.1841 | 0.5483 | | | | 2.6882 |
| S5 | Aspheric | −4464.9663 | 0.3996 | 1.62 | 25.9 | 51.96 | 99.0000 |
| S6 | Aspheric | −31.9850 | 0.2866 | | | | −74.4481 |
| S7 | Aspheric | 277.8891 | 0.2581 | 1.68 | 19.2 | −30.70 | 99.0000 |
| S8 | Aspheric | 19.3799 | 0.6273 | | | | 78.6797 |
| S9 | Aspheric | 13.2422 | 0.3500 | 1.67 | 20.3 | −490.78 | 5.3756 |
| S10 | Aspheric | 12.5935 | 0.4685 | | | | 13.5554 |
| S11 | Aspheric | 13.4293 | 0.3426 | 1.57 | 37.4 | −29.64 | 4.0142 |
| S12 | Aspheric | 7.4167 | 0.3469 | | | | −99.0000 |
| S13 | Aspheric | 2.4956 | 0.6269 | 1.55 | 56.1 | 7.75 | −8.3880 |
| S14 | Aspheric | 5.5410 | 1.4943 | | | | −15.7564 |
| S15 | Aspheric | −8.9288 | 0.6223 | 1.55 | 56.1 | −6.51 | −2.4533 |
| S16 | Aspheric | 6.0549 | 0.4145 | | | | −31.1703 |
| S17 | Spherical | Infinite | 0.1100 | 1.52 | 64.2 | | |
| S18 | Spherical | Infinite | 0.5224 | | | | |
| S19 | Spherical | Infinite | | | | | |

In the embodiment, a total effective focal length f of the optical imaging lens assembly is 8.01 mm. TTL is a total length of the optical imaging lens assembly (i.e., a distance from the object-side surface S1 of the first lens E1 to the imaging surface S19 of the optical imaging lens assembly on an optical axis), and TTL is 9.11 mm. ImgH is a half of a diagonal length of an effective pixel region on the imaging surface 519 of the optical imaging lens assembly, and ImgH is 6.50 mm. Semi-FOV is a half of a maximum field of view of the optical imaging lens assembly, and Semi-FOV is 37.7°. Fno is an f-number of the optical imaging lens assembly, and Frio is 1.90.

In Embodiment 1, both the object-side surface and the image-side surface of any lens in the first lens E1 to the eighth lens ER are aspheric surfaces, and a surface type x of each aspheric lens may be defined through, but not limited to, the following aspheric surface formula:

$$x = \frac{ch^2}{1+\sqrt{1-(k+1)c^2h^2}} + \sum A_i h^i, \quad (1)$$

wherein x is, a distance vector height from a vertex of the aspheric surface when the aspheric surface is at a height of h along the optical axis direction; c is a paraxial curvature of the aspheric surface, c=1/R (namely, the paraxial curvature c is a reciprocal of the curvature radius R in Table 1); k is a conic coefficient; and Ai is a correction coefficient of the i-th order of the aspheric surface. Tables 2-1 and 2-2 show higher-order coefficients A4, A6, A8, A10, A12, A14, A16, A18, A20, A22, A24, A26, A28, and A30 that can be used for each of the aspheric mirror surfaces S1-S16 in Embodiment 1.

heights. FIG. 2D shows a lateral color curve of the optical imaging lens assembly according to Embodiment 1 to represent deviation of different image heights on the imaging surface after the light passes through the lens. According to FIGS. 2A-2D, it can be seen that the optical imaging lens assembly provided in Embodiment 1 may achieve high imaging quality.

Embodiment 2

Figure 3:
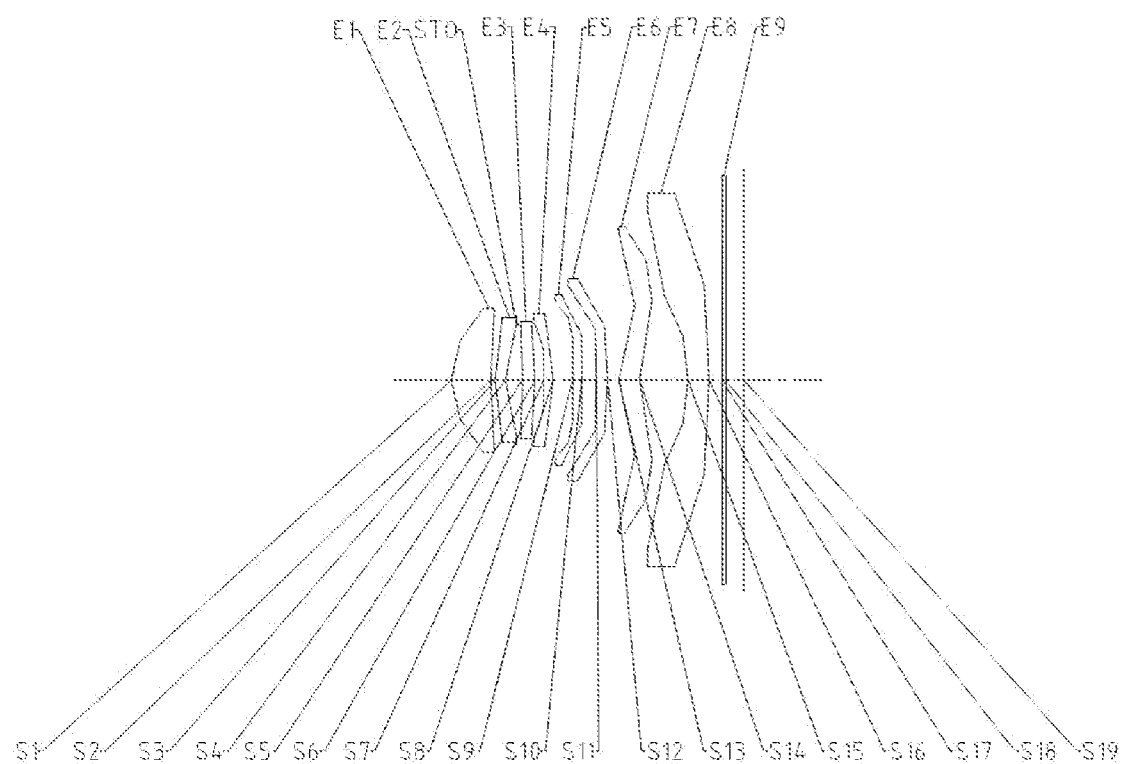
FIG. 3 shows a structural schematic diagram of an optical imaging lens assembly according to Embodiment 2 of the disclosure.

An optical imaging lens assembly according to Embodiment 2 of the disclosure will be described below with reference to FIGS. 3-4D. In the embodiment and the following embodiments, parts of descriptions similar to those about Embodiment 1 are omitted for simplicity. FIG. 3 shows a structural schematic diagram of an optical imaging lens assembly according to Embodiment 2 of the disclosure.

As shown in FIG. 3, the optical imaging lens assembly sequentially includes, from an object side to an image side,

TABLE 2-1

| Surface number | A4 | A6 | A8 | A10 | A12 | A14 | A16 |
|---|---|---|---|---|---|---|---|
| S1 | 1.4045E−01 | 2.2255E−03 | −2.0924E−03 | −8.4713E−04 | −1.9714E−04 | −7.3097E−05 | −1.0716E−05 |
| S2 | −7.8207E−02 | 9.8664E−03 | −4.8385E−03 | 1.0443E−03 | −4.4405E−04 | 6.0988E−05 | −3.6326E−05 |
| S3 | −7.4258E−02 | 2.1015E−02 | −6.5196E−03 | 1.0608E−03 | −6.9704E−04 | −2.4890E−05 | −5.5546E−05 |
| S4 | −7.3266E−04 | 1.8386E−02 | 3.6731E−04 | 1.2670E−03 | 1.2860E−04 | 4.4630E−05 | 2.3798E−05 |
| S5 | −6.4174E−02 | 9.4077E−03 | 2.3044E−03 | 9.7041E−04 | 7.0400E−05 | 7.5995E−05 | −4.7174E−06 |
| S6 | −1.2306E−01 | 7.5327E−03 | 5.2495E−04 | 8.3868E−04 | −3.0721E−04 | 1.5989E−04 | −4.6774E−05 |
| S7 | −3.7147E−01 | −1.0017E−02 | −6.0974E−03 | 3.0297E−04 | −5.8702E−04 | 2.8688E−04 | 1.0513E−04 |
| S8 | −5.0113E−01 | 1.4079E−02 | 4.4284E−03 | 6.3768E−03 | 8.2651E−04 | 1.4678E−04 | −8.3875E−04 |
| S9 | −1.0072E+00 | −2.9992E−02 | −1.2333E−02 | 2.6061E−02 | 7.1048E−03 | 4.1018E−03 | −4.9079E−04 |
| S10 | −1.0080E+00 | 1.7654E−02 | −1.3220E−02 | 2.2037E−02 | 3.3124E−03 | 1.7110E−03 | −1.2167E−03 |
| S11 | −1.0376E+00 | −6.5781E−03 | −2.0556E−02 | 2.2029E−02 | 4.3478E−03 | 4.0368E−03 | 3.6121E−04 |
| S12 | −1.2406E+00 | 2.0473E−01 | −3.0559E−02 | 2.4953E−02 | −9.6627E−03 | 2.7937E−03 | −4.9925E−04 |
| S13 | −1.7342E+00 | 2.1856E−01 | 6.8166E−02 | −5.8133E−02 | 1.7775E−02 | 1.1073E−03 | −1.6370E−03 |
| S14 | −1.3134E+00 | −1.0489E−01 | 1.0178E−01 | −6.0695E−02 | 2.7992E−02 | −1.0150E−02 | 3.9334E−03 |
| S15 | −2.7939E−01 | 5.7924E−01 | −3.7539E−01 | 1.6445E−01 | −5.5623E−02 | 7.6522E−03 | −2.6399E−04 |
| S16 | −2.3114E+00 | 6.9051E−01 | −2.5409E−01 | 6.2208E−02 | −2.3703E−02 | 1.2976E−02 | −1.1005E−02 |

TABLE 2-2

| Surface number | A18 | A20 | A22 | A24 | A26 | A28 | A30 |
|---|---|---|---|---|---|---|---|
| S1 | −2.1814E−05 | −7.4957E−06 | −5.0269E−06 | 1.2834E−06 | 3.5934E−06 | 2.1385E−06 | −2.6332E−06 |
| S2 | 1.1862E−05 | −4.1414E−06 | 3.0844E−06 | −1.6351E−06 | −1.6154E−06 | −3.7347E−07 | 1.5031E−06 |
| S3 | −1.0147E−05 | −2.4325E−06 | 2.7255E−06 | 2.1924E−06 | 2.0232E−06 | 1.1356E−06 | −2.1922E−06 |
| S4 | −4.4842E−06 | 9.2947E−06 | −5.3795E−06 | 4.4636E−06 | −1.3774E−06 | 3.7310E−06 | −4.4953E−06 |
| S5 | 1.7018E−05 | −6.8725E−06 | 3.4447E−06 | −4.9935E−06 | 2.0054E−06 | 3.4596E−07 | 1.2978E−07 |
| S6 | 3.4301E−05 | −4.3480E−05 | −1.9553E−06 | −2.7230E−05 | 4.8854E−06 | −5.2319E−06 | 8.3422E−06 |
| S7 | 5.4410E−05 | 6.7662E−06 | 1.2271E−06 | 1.9535E−07 | 6.7777E−06 | 8.9407E−06 | 4.9539E−06 |
| S8 | −8.7506E−04 | −6.1272E−04 | −3.8315E−04 | −1.6956E−04 | −7.3891E−05 | −1.0094E−05 | −8.4486E−06 |
| S9 | −7.3582E−04 | −5.8488E−04 | 8.7738E−05 | 1.8001E−04 | 1.4370E−04 | 1.1931E−05 | 1.0212E−07 |
| S10 | −8.0670E−04 | −6.9420E−04 | −2.4876E−04 | −9.5813E−05 | 4.2795E−05 | 5.2605E−05 | 2.9244E−05 |
| S11 | −2.5215E−04 | −4.4502E−04 | −2.5410E−04 | 7.4064E−06 | 1.6174E−05 | 5.1481E−05 | −1.5669E−05 |
| S12 | 4.7607E−04 | −3.2702E−04 | 9.7556E−05 | −3.1459E−06 | 4.2085E−05 | −2.0662E−05 | −6.2499E−07 |
| S13 | −2.8403E−03 | 1.3691E−03 | 1.8096E−04 | −3.2653E−05 | −8.6986E−05 | 2.3806E−05 | 4.1611E−05 |
| S14 | −1.4522E−03 | 6.8474E−04 | −5.3393E−04 | 1.3124E−04 | 1.3650E−04 | −2.2742E−05 | 2.4769E−05 |
| S15 | 4.8193E−03 | −4.6775E−03 | 2.7306E−03 | −6.8241E−04 | −2.5798E−04 | 3.4241E−04 | −1.2314E−04 |
| S16 | 6.1216E−03 | −2.3275E−03 | 8.7279E−04 | 2.7400E−04 | −1.9970E−04 | −9.9869E−05 | 3.9411E−05 |

Figure 2A:
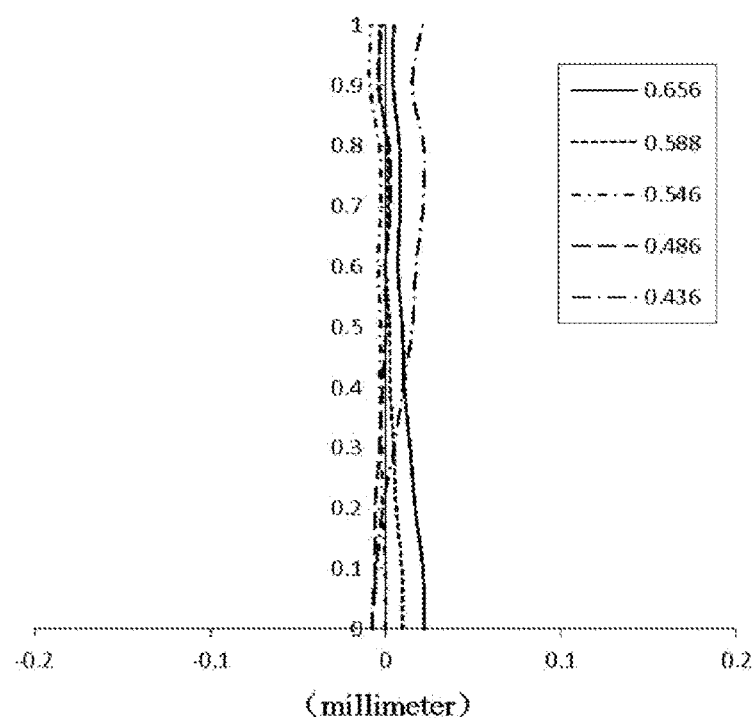
FIGS. 2A-2D show a longitudinal aberration curve, an astigmatism curve, a distortion curve, and a lateral color curve of an optical imaging lens assembly according to Embodiment 1 respectively.
Figure 2B:
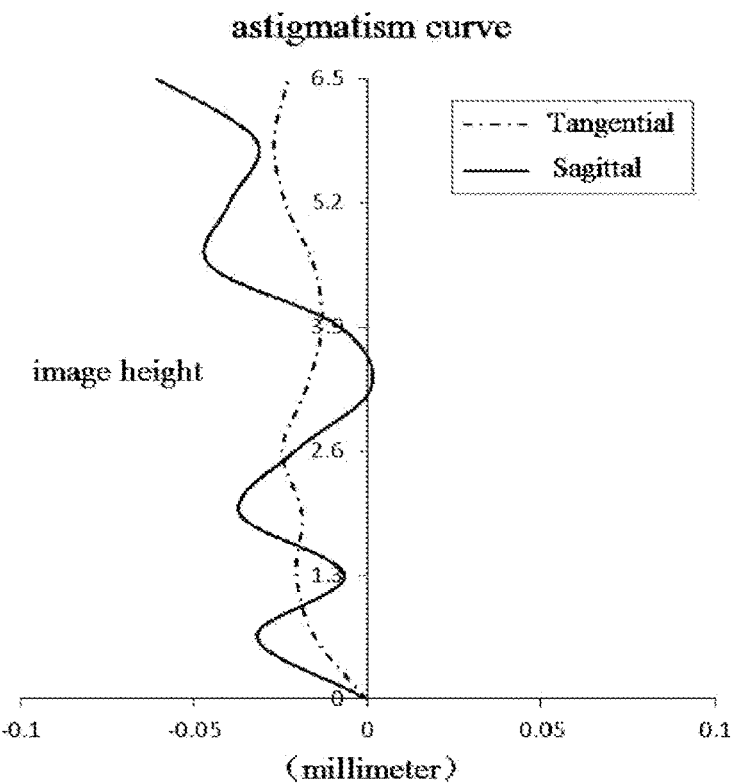
Figure 2C:
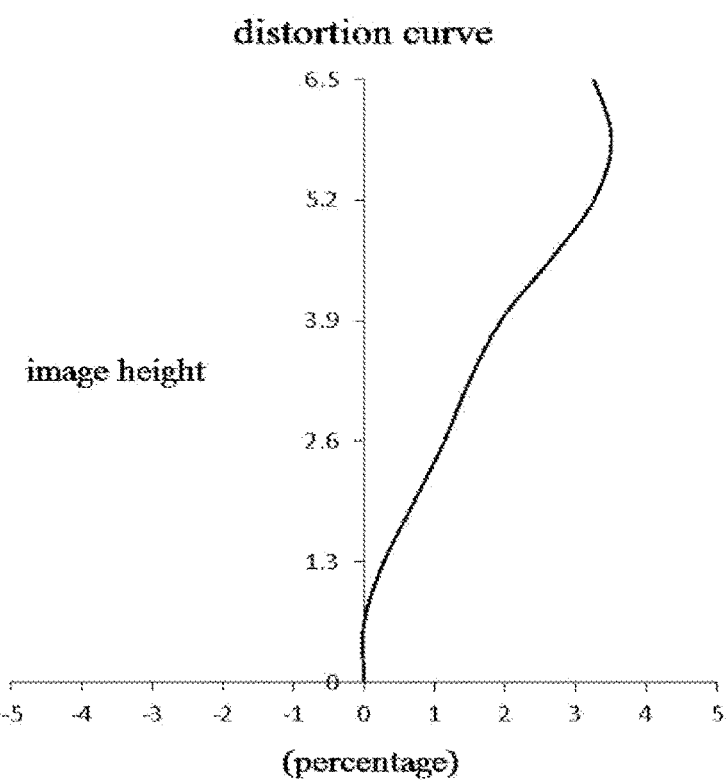
Figure 2D:
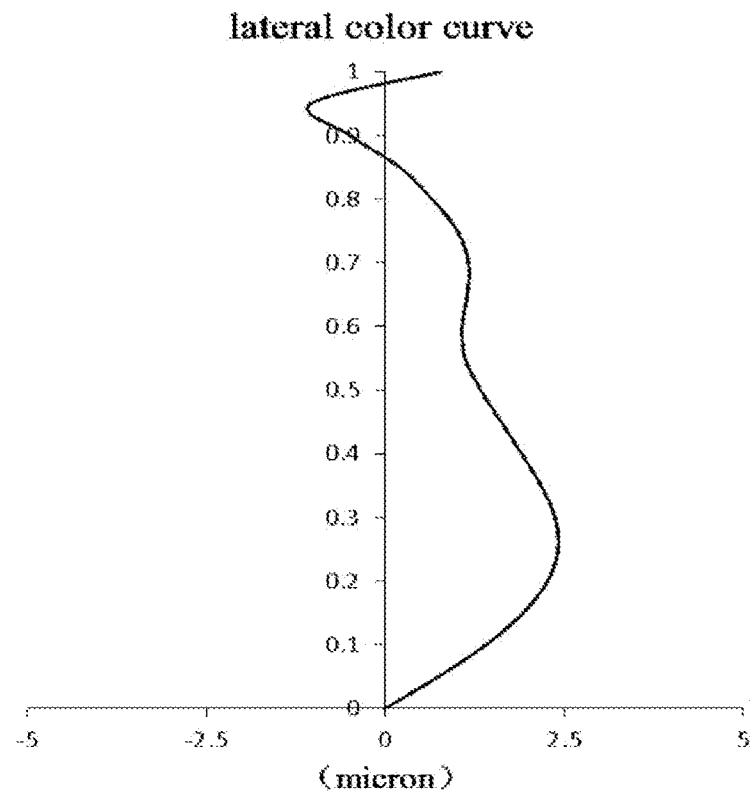

FIG. 2A shows a longitudinal aberration curve of the optical imaging lens assembly according to Embodiment 1 to represent deviation of a convergence focal point after light with different wavelengths passes through the lens. FIG. 2B shows an astigmatism curve of the optical imaging lens assembly according to Embodiment 1 to represent a tangential image surface curvature and a sagittal image surface curvature. FIG. 2C shows a distortion curve of the optical imaging lens assembly according to Embodiment 1 to represent distortion values corresponding to different image a first lens E1, a second lens E2, a diaphragm STO, a third lens E3, a fourth lens E4, a fifth lens E5, a sixth lens E6, a seventh lens E7, an eighth lens E8, an optical filter E9 and an imaging surface S19.

The first lens E1 has a positive refractive power, an object-side surface S1 thereof is a convex surface, and an image-side surface S2 thereof is a concave surface. The second lens E2 has a negative refractive power, an object-side surface S3 thereof is a convex surface, and an image-side surface S4 thereof is a concave surface. The third lens E3 has a negative refractive power, an object-side surface S5 thereof is a concave surface, and an image-side surface S6 thereof is a concave surface. The fourth lens E4 has a negative refractive power, an object-side surface S7 thereof is a convex surface, and an image-side surface S8 thereof is a concave surface. The fifth lens E5 has a negative refractive power, an object-side surface S9 thereof is a convex surface, and an image-side surface S10 thereof is a concave surface. The sixth lens E6 has a negative refractive power, an object-side surface S11 thereof is a convex surface, and an image-side surface S12 thereof is a concave surface. The seventh lens E7 has a positive refractive power, an object-side surface S13 thereof is a convex surface, and an image-side surface S14 thereof is a concave surface. The eighth lens E8 has a negative refractive power, an object-side surface S15 thereof is a concave surface, and an image-side surface S16 thereof is a concave surface. The optical filter E9 has an object-side surface S17 and an image-side surface S18. Light from an object sequentially penetrates through each of the surfaces S1 to S18 and is finally imaged on the imaging surface S19.

In the embodiment, a total effective focal length f of the optical imaging lens is 7.79 mm. TTL is a total length of the optical imaging lens, and TTL is 9.11 mm. ImgH is a half of a diagonal length of an effective pixel region on the imaging surface S19 of the optical imaging lens assembly, and ImgH is 6.60 mm. Semi-FOV is a half of a maximum field of view of the optical imaging lens assembly, and Semi-FOV is 38.4°. Fno is an f-number of the optical imaging lens assembly, and Fno is 1.90.

Table 3 shows a basic parameter table of the optical imaging lens assembly of Embodiment 2, wherein the units of the curvature radius, the thickness/distance and the focal length are all millimeters (mm). Tables 4-1 and 4-2 show high-order coefficients applied to each aspheric mirror surface in Embodiment 2. A surface type of each aspheric surface may be defined by formula (1) given in Embodiment 1.

TABLE 3

| Surface number | Surface type | Curvature radius | Thickness/ distance | Refractive index | Abbe number | Focal length | Conic coefficient |
|---|---|---|---|---|---|---|---|
| OBJ | Spherical | Infinite | Infinite | | | | |
| S1 | Aspheric | 2.9771 | 1.2239 | 1.55 | 56.1 | 6.67 | −0.9773 |
| S2 | Aspheric | 13.8532 | 0.1423 | | | | 22.1557 |
| S3 | Aspheric | 9.3862 | 0.3154 | 1.68 | 19.2 | −18.94 | 17.8938 |
| S4(STO) | Aspheric | 5.3518 | 0.5388 | | | | 2.7297 |
| S5 | Aspheric | −170.9519 | 0.3861 | 1.62 | 25.9 | −200.00 | −99.0000 |
| S6 | Aspheric | 451.9285 | 0.2777 | | | | 99.0000 |
| S7 | Aspheric | 26.8504 | 0.2960 | 1.68 | 19.2 | −101.15 | −92.5634 |
| S8 | Aspheric | 19.2168 | 0.5977 | | | | 79.1748 |
| S9 | Aspheric | 13.1339 | 0.2808 | 1.67 | 20.3 | −208.62 | 4.8002 |
| S10 | Aspheric | 11.9004 | 0.4614 | | | | 13.5011 |
| S11 | Aspheric | 12.4998 | 0.3503 | 1.57 | 37.4 | −21.69 | 5.4442 |
| S12 | Aspheric | 6.1566 | 0.3529 | | | | −98.7842 |
| S13 | Aspheric | 2.2310 | 0.6417 | 1.55 | 56.1 | 7.01 | −8.3365 |
| S14 | Aspheric | 4.8010 | 1.5150 | | | | −16.3050 |
| S15 | Aspheric | −9.5673 | 0.6491 | 1.55 | 56.1 | −7.59 | −2.4284 |
| S16 | Aspheric | 7.4945 | 0.4145 | | | | −25.9570 |
| S17 | Spherical | Infinite | 0.1100 | 1.52 | 64.2 | | |
| S18 | Spherical | Infinite | 0.5531 | | | | |
| S19 | Spherical | Infinite | | | | | |

TABLE 4-1

| Surface number | A4 | A6 | A8 | A10 | A12 | A14 | A16 |
|---|---|---|---|---|---|---|---|
| S1 | 1.4147E−01 | 3.5288E−03 | −2.1262E−03 | −8.7719E−04 | −3.2322E−04 | −8.6171E−05 | −4.6788E−05 |
| S2 | −7.9624E−02 | 1.0027E−02 | −5.0012E−03 | 9.1039E−04 | −3.8924E−04 | 1.4030E−05 | −7.8346E−06 |
| S3 | −7.4002E−02 | 2.1292E−02 | −6.3781E−03 | 1.2244E−03 | −6.4131E−04 | −9.6301E−06 | −3.2380E−05 |
| S4 | 6.0300E−06 | 1.8144E−02 | 3.6719E−04 | 1.4566E−04 | 1.7376E−04 | 8.7185E−05 | 2.3638E−05 |
| S5 | −6.4424E−02 | 9.2393E−03 | 2.2648E−03 | 8.5770E−04 | 1.9047E−04 | 2.6581E−05 | 3.6213E−05 |
| S6 | −1.2275E−01 | 8.1147E−03 | 2.1603E−04 | 4.4858E−04 | −1.9399E−04 | 7.9305E−06 | −1.2118E−05 |
| S7 | −3.7244E−01 | −9.4382E−03 | −6.1355E−03 | 5.7500E−04 | −6.8855E−04 | 3.1659E−04 | −3.8808E−05 |
| S8 | −4.9974E−01 | 1.2851E−02 | 5.1107E−03 | 6.5613E−03 | 8.4495E−04 | 1.3906E−04 | −9.3864E−04 |
| S9 | −1.0112E+00 | −2.4921E−02 | −1.4996E−02 | 2.5963E−02 | 7.6541E−03 | 4.0360E−03 | −3.7951E−04 |
| S10 | −1.0062E+00 | 1.5525E−02 | −1.1831E−02 | 2.2138E−02 | 4.3265E−03 | 1.4111E−03 | −1.1502E−03 |
| S11 | −1.0319E+00 | −6.5160E−03 | −2.0533E−02 | 2.1715E−02 | 4.1953E−03 | 3.9908E−03 | 3.7741E−04 |
| S12 | −1.2766E+00 | 2.0337E−01 | −3.0837E−02 | 2.5730E−02 | −9.6312E−03 | 2.7923E−03 | −5.4393E−04 |
| S13 | −1.6531E+00 | 2.1653E−01 | 6.6191E−02 | −5.9666E−02 | 1.9206E−02 | 2.3043E−04 | −4.0439E−04 |
| S14 | −1.3258E+00 | −1.0656E−01 | 1.0351E−01 | −5.6625E−02 | 2.6463E−02 | −8.5615E−03 | 3.6089E−03 |
| S15 | −2.8001E−01 | 5.8631E−01 | −3.7370E−01 | 1.6463E−01 | −5.4862E−02 | 7.1466E−03 | −7.8682E−04 |
| S16 | −2.1728E+00 | 6.9467E−01 | −2.5353E−01 | 6.8169E−02 | −2.2861E−02 | 1.2294E−02 | −1.1111E−02 |

TABLE 4-2

| Surface number | A18 | A20 | A22 | A24 | A26 | A28 | A30 |
|---|---|---|---|---|---|---|---|
| S1 | −6.1696E−06 | −1.5788E−05 | −3.0947E−07 | 3.7058E−06 | 7.4139E−06 | −2.8703E−06 | −4.0349E−06 |
| S2 | −1.4635E−05 | 9.4160E−06 | −9.7845E−06 | 7.1389E−06 | 4.6833E−08 | 6.0217E−06 | −5.4822E−06 |
| S3 | 6.3414E−06 | 2.0424E−05 | 2.1026E−05 | 2.1315E−05 | 1.7655E−05 | 1.0263E−05 | 5.6762E−06 |
| S4 | −2.7358E−06 | 1.6772E−06 | 1.9178E−06 | 6.6169E−06 | −2.7475E−06 | −5.7539E−06 | −2.3292E−06 |
| S5 | −4.0606E−06 | 8.3138E−06 | −1.0420E−05 | −6.2524E−07 | −2.9289E−06 | 2.8204E−06 | 1.6694E−06 |
| S6 | −2.4769E−05 | −1.4451E−05 | −1.7390E−05 | −2.5248E−06 | −7.9094E−07 | −5.6139E−06 | −8.1156E−06 |
| S7 | 7.6367E−05 | −5.1975E−05 | 2.6429E−05 | −1.1943E−05 | 2.2496E−05 | 9.3768E−07 | 1.1304E−05 |
| S8 | −8.6177E−04 | −6.9479E−04 | −4.0540E−04 | −2.4304E−04 | −1.1801E−04 | −5.2158E−05 | −1.5442E−05 |
| S9 | −8.1083E−04 | −5.8698E−04 | −3.4004E−05 | 1.7693E−04 | 2.0473E−04 | 1.1801E−04 | 3.4490E−05 |
| S10 | −1.2065E−03 | −8.0640E−04 | −5.6142E−04 | −3.0620E−04 | −2.2245E−04 | −5.9425E−05 | −3.5693E−05 |
| S11 | −2.5251E−04 | −4.4300E−04 | −2.5321E−04 | 6.9642E−06 | 1.6407E−05 | 5.1339E−05 | −1.5691E−05 |
| S12 | 5.1517E−04 | −3.2501E−04 | 9.4689E−05 | −2.1931E−06 | 3.3292E−05 | −1.8323E−05 | −1.2249E−06 |
| S13 | −2.1902E−03 | 1.5397E−03 | 3.6595E−04 | 1.8053E−04 | −1.7288E−04 | −8.1684E−05 | 1.6391E−05 |
| S14 | −9.1528E−04 | 3.3409E−04 | −1.5476E−04 | 4.4640E−04 | 4.7224E−04 | 8.0234E−05 | 1.0207E−04 |
| S13 | 4.4249E−03 | −4.6052E−03 | 2.4275E−03 | −8.2899E−04 | −2.3433E−04 | 2.6763E−04 | −9.5360E−05 |
| S14 | 5.9043E−03 | −2.3263E−03 | 8.4764E−04 | 2.6883E−04 | −2.0630E−04 | −9.4208E−05 | 3.8798E−05 |

Figure 4A:
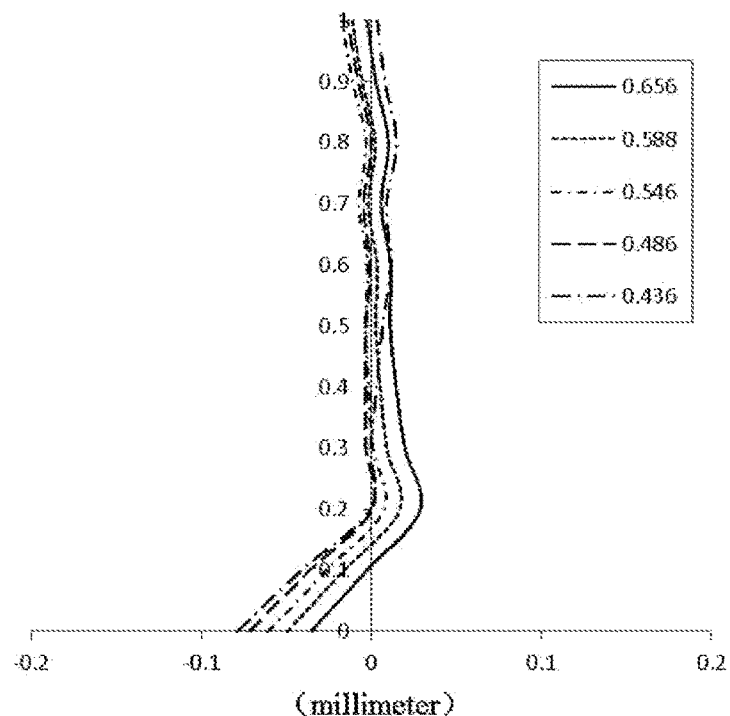
FIGS. 4A-4D show a longitudinal aberration curve, astigmatism curve, distortion curve, and lateral color curve of an optical imaging lens assembly according to Embodiment 2 respectively.
Figure 4B:
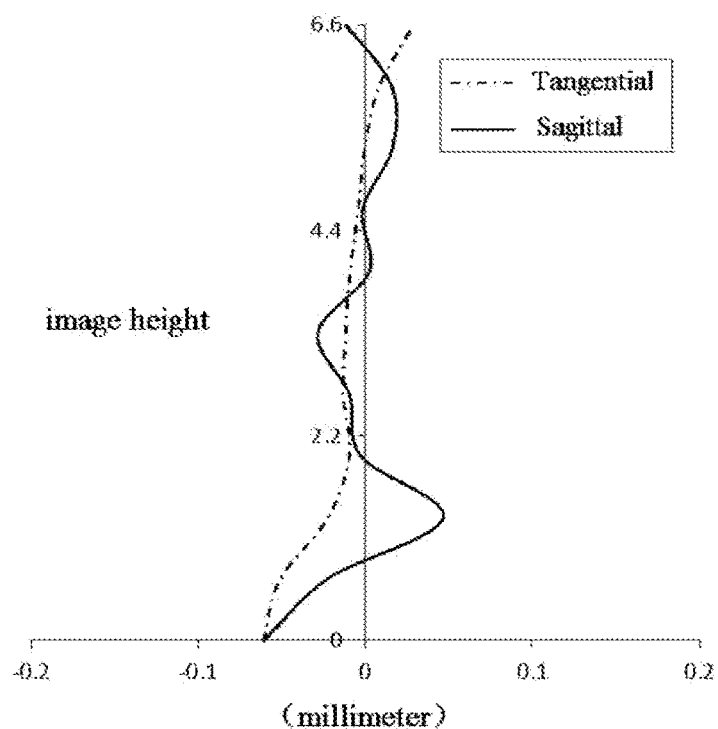
Figure 4C:
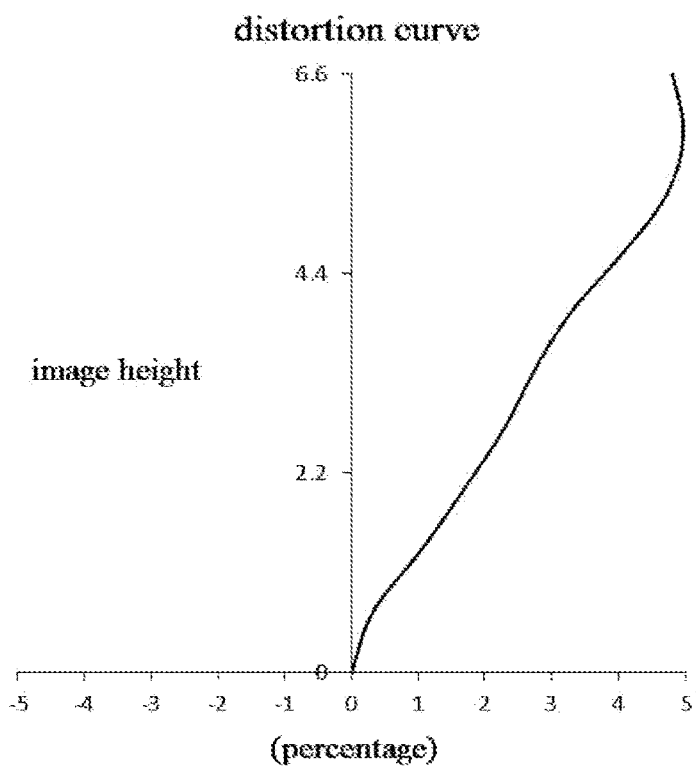
Figure 4D:
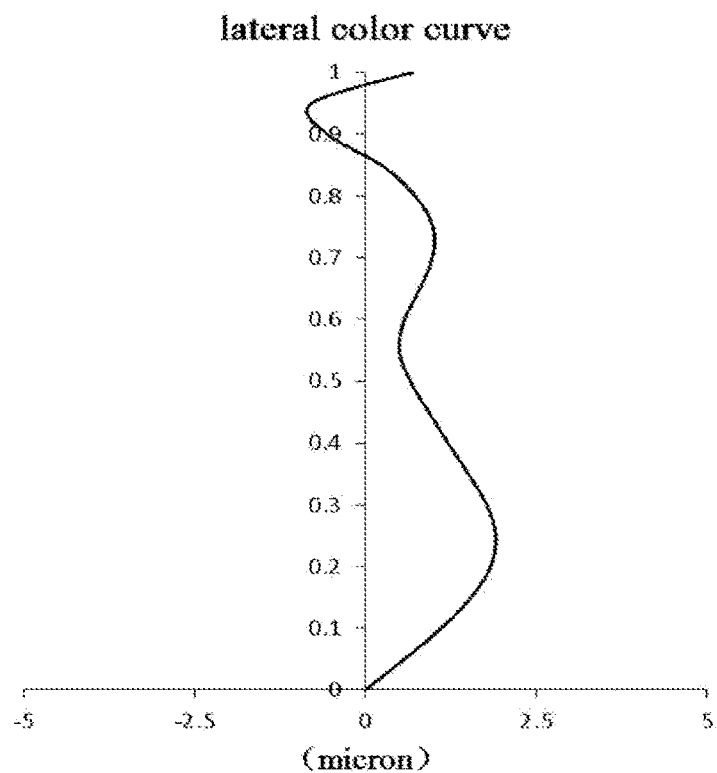

FIG. 4A shows a longitudinal aberration curve of the optical imaging lens assembly according to Embodiment 2 to represent deviation of a convergence focal point after light with different wavelengths passes through the lens assembly. FIG. 4B shows an astigmatism curve of the optical imaging lens assembly according to Embodiment 2 to represent a tangential image surface curvature and a sagittal image surface curvature. FIG. 4C shows a distortion curve of the optical imaging lens assembly according to Embodiment 2 to represent distortion values corresponding to different image heights. FIG. 4D shows a lateral color curve of the optical imaging lens assembly according to Embodiment 2 to represent deviation of different image heights on the imaging surface after the light passes through the lens assembly. According to FIGS. 4A-4D, it can be seen that the optical imaging lens assembly provided in Embodiment 2 may achieve high imaging quality.

Embodiment 3

Figure 5:
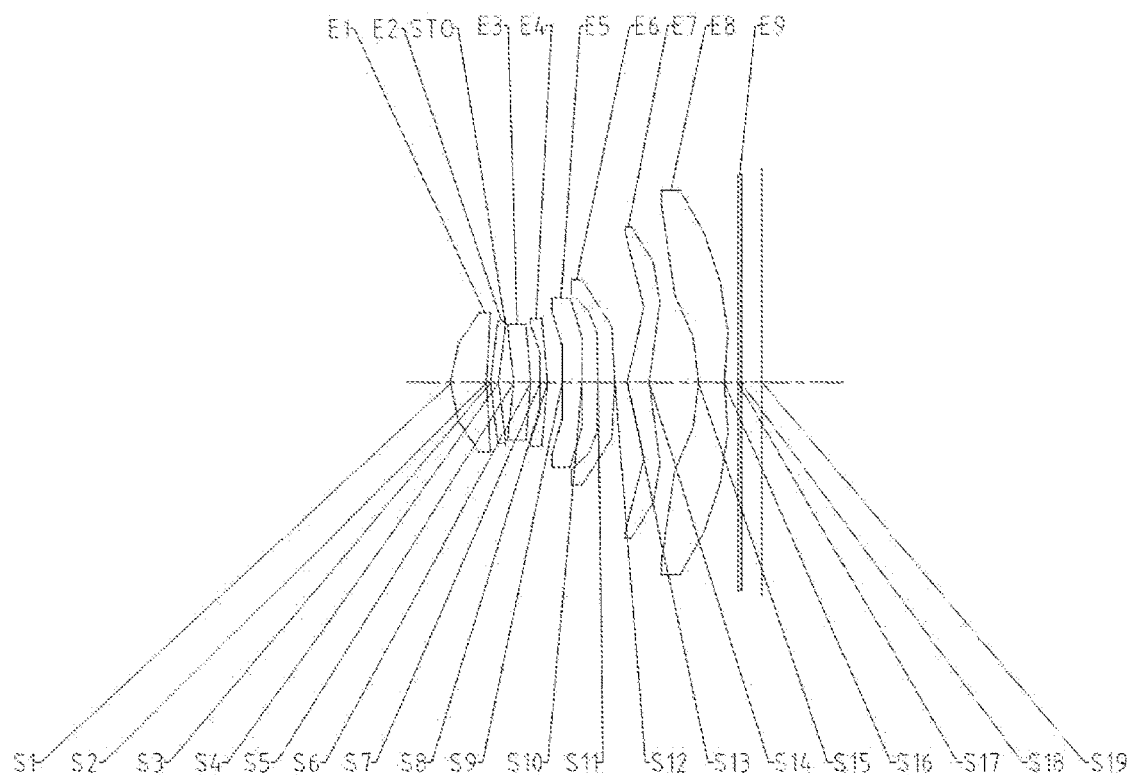
FIG. 5 shows a structural schematic diagram of an optical imaging lens assembly according to Embodiment 3 of the disclosure.

An optical imaging lens according to Embodiment 3 of the disclosure is described below with reference to FIGS. 5-6D. FIG. 5 shows a structural schematic diagram of an optical imaging lens assembly according to Embodiment 3 of the disclosure.

As shown in FIG. 5, the optical imaging lens assembly sequentially includes, from an object side to an image side, a first lens E1, a second lens E2, a diaphragm STO, a third lens E3, a fourth lens E4, a fifth lens E5, a sixth lens E6, a seventh lens E7, an eighth lens E8, an optical filter E9 and an imaging surface S19.

The first lens E1 has a positive refractive power, an object-side surface S1 thereof is a convex surface, and an image-side surface S2 thereof is a concave surface. The second lens E2 has a positive refractive power, an object-side surface S3 thereof is a convex surface, and an image-side surface S4 thereof is a concave surface. The third lens E3 has a negative refractive power, an object-side surface S5 thereof is a concave surface, and an image-side surface S6 thereof is a convex surface. The fourth lens E4 has a negative refractive power, an object-side surface S7 thereof is a convex surface, and an image-side surface S8 thereof is a concave surface. The fifth lens E5 has a negative refractive power, an object-side surface S9 thereof is a convex surface, and an image-side surface S10 thereof is a concave surface. The sixth lens E6 has a negative refractive power, an object-side surface S11 thereof is a convex surface, and an image-side surface S12 thereof is a concave surface. The seventh lens E7 has a positive refractive power, an object-side surface S13 thereof is a convex surface, and an image-side surface S14 thereof is a concave surface. The eighth lens E8 has a negative refractive power, an object-side surface S15 thereof is a concave surface, and an image-side surface S16 thereof is a concave surface. The optical filter E9 has an object-side surface S17 and an image-side surface S18. Light from an object sequentially penetrates through each of the surfaces S1 to S18 and is finally imaged on the imaging surface S19.

In the embodiment, a total effective focal length f of the optical imaging lens is 7.68 mm. TTL is a total length of the optical imaging lens, and TTL is 9.61 mm. ImgH is a half of a diagonal length of an effective pixel region on the imaging surface S19 of the optical imaging lens assembly, and ImgH is 6.50 mm. Semi-FOV is a half of a maximum field of view of the optical imaging lens assembly, and Semi-FOV is 37.5°. Fno is an f-number of the optical imaging lens assembly, and Fno is 1.90.

Table 5 shows a basic parameter table of the optical imaging lens assembly of Embodiment 3, wherein the units of the curvature radius, the thickness/distance and the focal length are all millimeters (mm). Tables 6-1 and 6-2 show high-order coefficients applied to each aspheric mirror surface in Embodiment 3. A surface type of each aspheric surface may be defined by formula (1) given in Embodiment 1.

TABLE 5

| Surface number | Surface type | Curvature radius | Thickness/ distance | Material Refractive index | Material Abbe number | Focal length | Conic coefficient |
|---|---|---|---|---|---|---|---|
| OBJ | Spherical | Infinite | Infinite | | | | |
| S1 | Aspheric | 2.9761 | 1.1043 | 1.55 | 56.1 | 6.82 | −0.9848 |
| S2 | Aspheric | 12.8610 | 0.1352 | | | | 21.5131 |

TABLE 5-continued

| Surface number | Surface type | Curvature radius | Thickness/ distance | Material Refractive index | Abbe number | Focal length | Conic coefficient |
|---|---|---|---|---|---|---|---|
| S3 | Aspheric | 8.9167 | 0.2437 | 1.68 | 19.2 | 300.00 | 17.8718 |
| S4(STO) | Aspheric | 9.2219 | 0.4664 | | | | 4.2859 |
| S5 | Aspheric | −11.0927 | 0.5274 | 1.62 | 25.9 | −25.97 | −12.1763 |
| S6 | Aspheric | −36.3137 | 0.3014 | | | | −98.9944 |
| S7 | Aspheric | 67.4505 | 0.2224 | 1.68 | 19.2 | −37.11 | −98.9845 |
| S8 | Aspheric | 18.3191 | 0.4358 | | | | 81.8318 |
| S9 | Aspheric | 12.5119 | 0.6161 | 1.67 | 20.3 | −164.46 | −14.4741 |
| S10 | Aspheric | 11.0116 | 0.4911 | | | | 16.3226 |
| S11 | Aspheric | 13.1447 | 0.5136 | 1.57 | 37.4 | −9.84 | −3.8574 |
| S12 | Aspheric | 3.8792 | 0.3845 | | | | −99.0000 |
| S13 | Aspheric | 1.9274 | 0.6869 | 1.55 | 56.1 | 5.02 | −8.2497 |
| S14 | Aspheric | 5.6770 | 1.5244 | | | | −21.1739 |
| S15 | Aspheric | −9.9369 | 0.7986 | 1.55 | 56.1 | −5.31 | −3.3138 |
| S16 | Aspheric | 4.2134 | 0.4145 | | | | −27.5650 |
| S17 | Spherical | Infinite | 0.1100 | 1.52 | 64.2 | | |
| S18 | Spherical | Infinite | 0.6324 | | | | |
| S19 | Spherical | Infinite | | | | | |

TABLE 6-1

| Surface number | A4 | A6 | A8 | A10 | A12 | A14 | A16 |
|---|---|---|---|---|---|---|---|
| S1 | 1.4060E−01 | 4.6000E−03 | −4.7869E−03 | −1.8056E−03 | −1.3655E−03 | −1.2584E−04 | 6.7958E−05 |
| S2 | −7.9644E−02 | 6.3089E−03 | −5.4943E−03 | −5.3183E−04 | −1.2428E−04 | 3.9156E−04 | 6.0789E−04 |
| S3 | −8.1683E−02 | 2.7001E−02 | −8.5865E−03 | 8.3972E−04 | −2.1938E−03 | 1.6272E−04 | −7.1231E−05 |
| S4 | 5.0566E−03 | 1.3710E−02 | 1.5991E−03 | 1.3548E−03 | 4.2641E−04 | −2.3934E−07 | 1.8690E−04 |
| S5 | −6.0349E−02 | 9.9687E−03 | 1.4327E−03 | 1.2277E−03 | 6.9001E−05 | 1.5985E−04 | 4.2202E−05 |
| S6 | −1.2117E−01 | 8.1193E−03 | −4.6189E−04 | −8.9839E−05 | −3.8287E−04 | 1.6156E−04 | 2.1089E−04 |
| S7 | −3.7959E−01 | −1.2192E−02 | −3.8585E−03 | 9.8008E−04 | −4.3723E−04 | −3.4268E−05 | 6.4794E−04 |
| S3 | −4.7374E−01 | 1.8293E−02 | −4.4933E−03 | 7.6615E−03 | −5.4496E−04 | 1.1035E−03 | −7.7422E−05 |
| S9 | −1.0637E+00 | −2.4243E−02 | −1.9813E−02 | 3.5591E−02 | 5.9925E−03 | 1.5518E−03 | −1.5008E−04 |
| S10 | −9.6519E−01 | 2.0247E−02 | −7.3636E−03 | 1.2283E−02 | 5.2926E−03 | 8.5623E−05 | −1.6402E−04 |
| S11 | −1.0619E+00 | −1.7157E−02 | −1.8482E−02 | 2.4428E−02 | 4.0422E−03 | 6.1932E−03 | −4.7523E−05 |
| S12 | −1.2382E+00 | 2.0947E−01 | −3.4876E−02 | 2.1154E−02 | −1.0483E−02 | 2.0949E−03 | −1.4466E−03 |
| S13 | −1.6685E+00 | 2.2689E−01 | 6.9996E−02 | −6.0260E−02 | 1.4736E−02 | 5.3726E−03 | −1.4959E−03 |
| S14 | −1.2766E+00 | −8.3898E−02 | 9.4474E−02 | −6.0189E−02 | 2.8421E−02 | −1.0126E−02 | 3.0259E−03 |
| S15 | −2.3315E−01 | 5.8222E−01 | −3.7190E−01 | 1.6567E−01 | −5.5196E−02 | 7.3447E−03 | −4.0682E−04 |
| S16 | −2.4158E+00 | 7.1649E−01 | −2.4865E−01 | 6.6085E−02 | −2.3315E−02 | 1.2190E−02 | −1.1102E−02 |

TABLE 6-2

| Surface number | A18 | A20 | A22 | A24 | A26 | A28 | A30 |
|---|---|---|---|---|---|---|---|
| S1 | 4.5659E−04 | 2.9987E−04 | 2.7328E−04 | 6.5435E−05 | 9.1468E−05 | 4.2418E−05 | 4.9118E−05 |
| S2 | 2.2946E−04 | 2.9921E−04 | 2.8338E−05 | 7.5304E−05 | −5.3057E−05 | 3.1392E−05 | −1.1185E−04 |
| S3 | 4.2793E−04 | 2.5243E−04 | 3.5980E−04 | 1.9484E−04 | 1.7891E−04 | 6.5687E−05 | 6.9003E−05 |
| S4 | −5.0333E−05 | 8.3510E−05 | −1.5299E−05 | 4.4403E−05 | −4.4699E−05 | 3.4466E−05 | −2.2355E−05 |
| S5 | −2.9500E−05 | −2.7627E−05 | −6.2471E−06 | 4.3973E−06 | 3.6138E−05 | −5.2685E−06 | −1.0870E−05 |
| S6 | 3.5936E−05 | 1.2446E−04 | 7.6302E−05 | 6.8149E−05 | 3.6827E−05 | 3.0447E−05 | 2.3692E−05 |
| S7 | −5.1146E−04 | −3.9888E−05 | −3.5614E−04 | −1.5843E−04 | −3.0315E−04 | −1.3050E−04 | −9.7905E−05 |
| S8 | −9.0034E−04 | −5.0248E−04 | −7.2755E−04 | −4.6074E−04 | −2.8225E−04 | −2.3947E−05 | 1.7543E−05 |
| S9 | 4.0942E−04 | −2.0979E−04 | −5.4909E−04 | −3.4021E−04 | 3.8794E−04 | 3.3422E−04 | 1.9807E−04 |
| S10 | −1.0349E−03 | −3.3070E−04 | 1.1223E−04 | 2.4303E−04 | 1.8359E−04 | 8.9483E−05 | 7.2071E−06 |
| S11 | 1.0653E−03 | −7.0218E−04 | 6.6615E−05 | −9.0082E−06 | 1.2530E−04 | 1.5774E−05 | −3.0077E−05 |
| S12 | 5.4999E−04 | −6.7138E−04 | 1.8659E−05 | 8.4227E−05 | 6.6728E−05 | 1.8488E−05 | −2.4867E−05 |
| S13 | −2.7403E−03 | 1.3806E−03 | 4.2256E−04 | −2.6225E−04 | −1.0698E−04 | −5.5609E−05 | 7.9060E−05 |
| S14 | −1.8153E−03 | 4.1809E−04 | −5.3721E−04 | 2.2422E−04 | 1.9410E−04 | −3.0938E−05 | 6.1722E−05 |
| S15 | 4.6223E−03 | −4.6356E−03 | 2.4328E−03 | −7.5701E−04 | −1.7622E−04 | 3.1376E−04 | −1.0707E−04 |
| S16 | 5.8926E−03 | −2.3183E−03 | 8.5540E−04 | 2.7078E−04 | −2.0722E−04 | −9.5487E−05 | 3.7650E−05 |

Figure 6A:
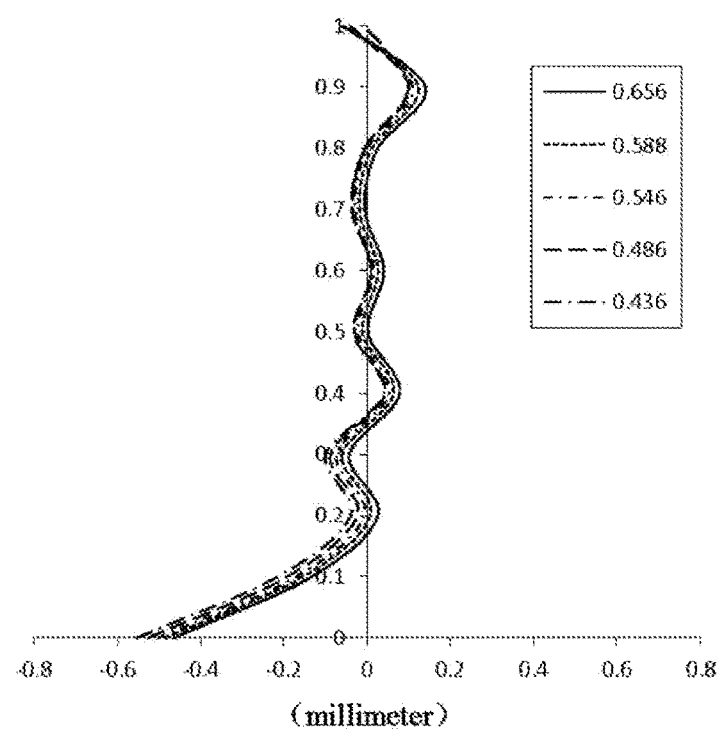
FIGS. 6A-6D show a longitudinal aberration curve, astigmatism curve, distortion curve, and lateral color curve of an optical imaging lens assembly according to Embodiment 3 respectively.
Figure 6B:
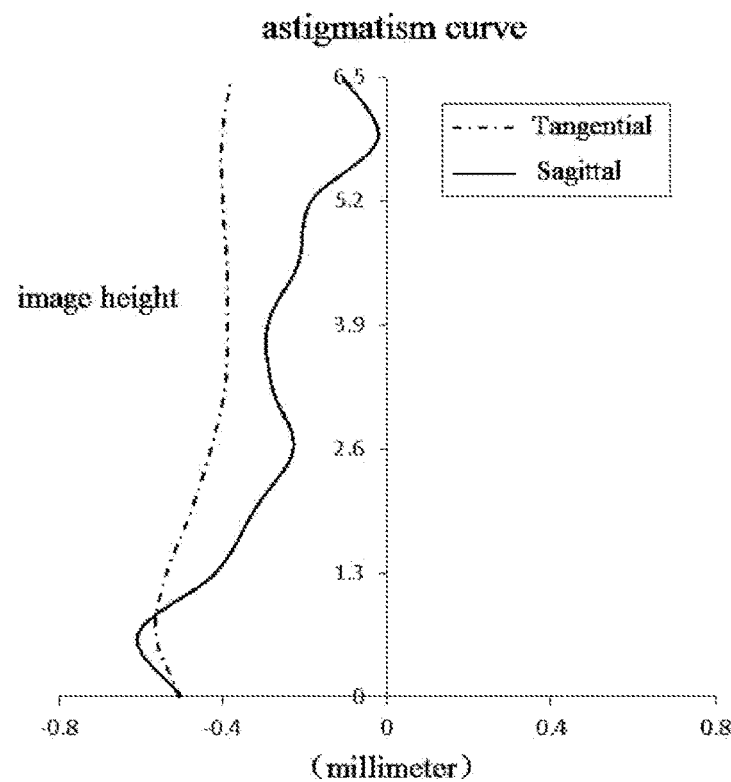
Figure 6C:
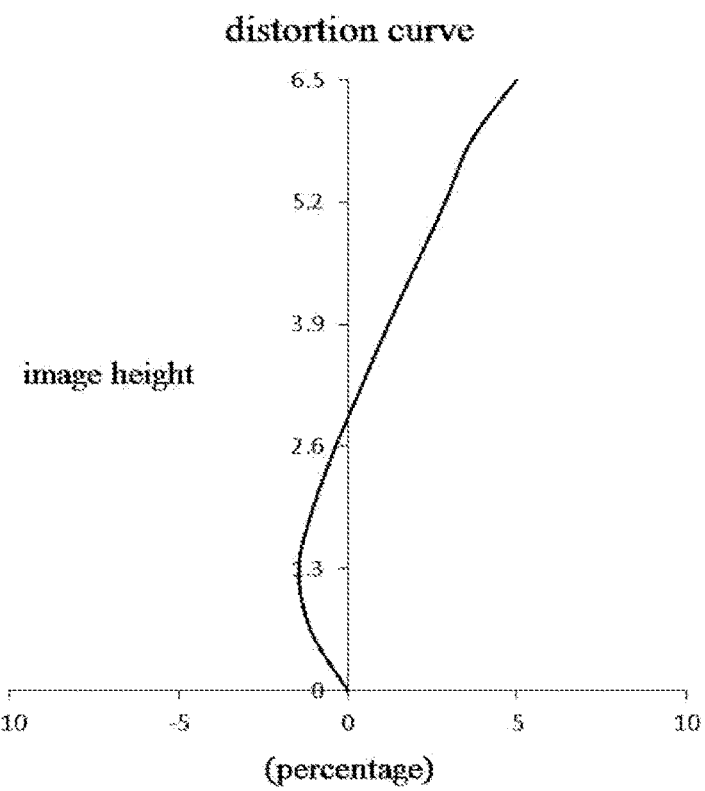
Figure 6D:
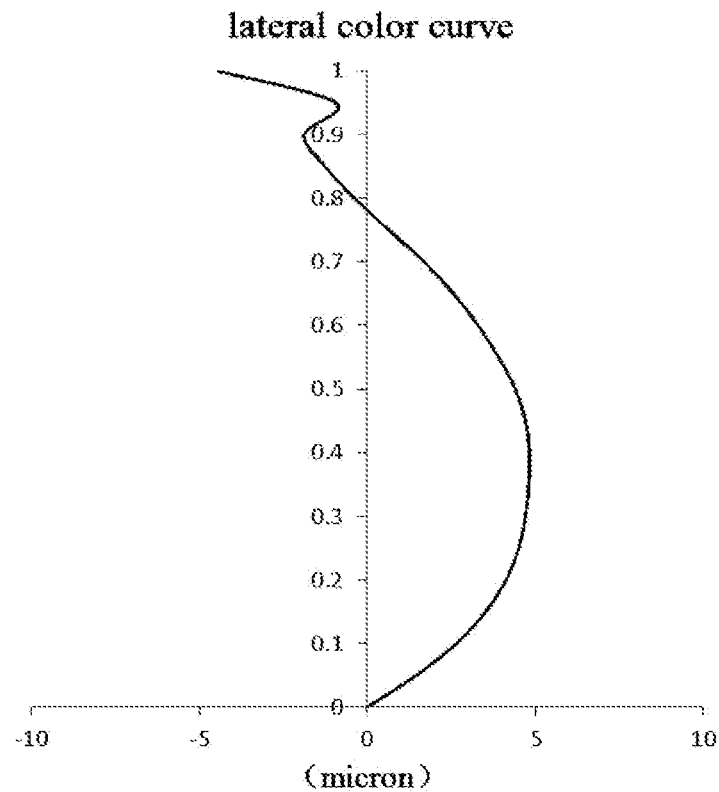

FIG. 6A shows a longitudinal aberration curve of the optical imaging lens assembly according to Embodiment 3 to represent deviation of a convergence focal point after light with different wavelengths passes through the lens assembly. FIG. 6B shows an astigmatism curve of the optical imaging lens assembly according to Embodiment 3 to represent a tangential image surface curvature and a sagittal image surface curvature. FIG. 6C shows a distortion curve of the optical imaging lens assembly according to Embodiment 3 to represent distortion values corresponding to different image heights. FIG. 6D shows a lateral color curve of the optical imaging lens assembly according to Embodiment 3 to represent deviation of different image heights on the imaging surface after the light passes through the lens assembly. According to FIGS. 6A-6D, it can be seen that the optical imaging lens assembly provided in Embodiment 3 may achieve high imaging quality.

Embodiment 4

Figure 7:
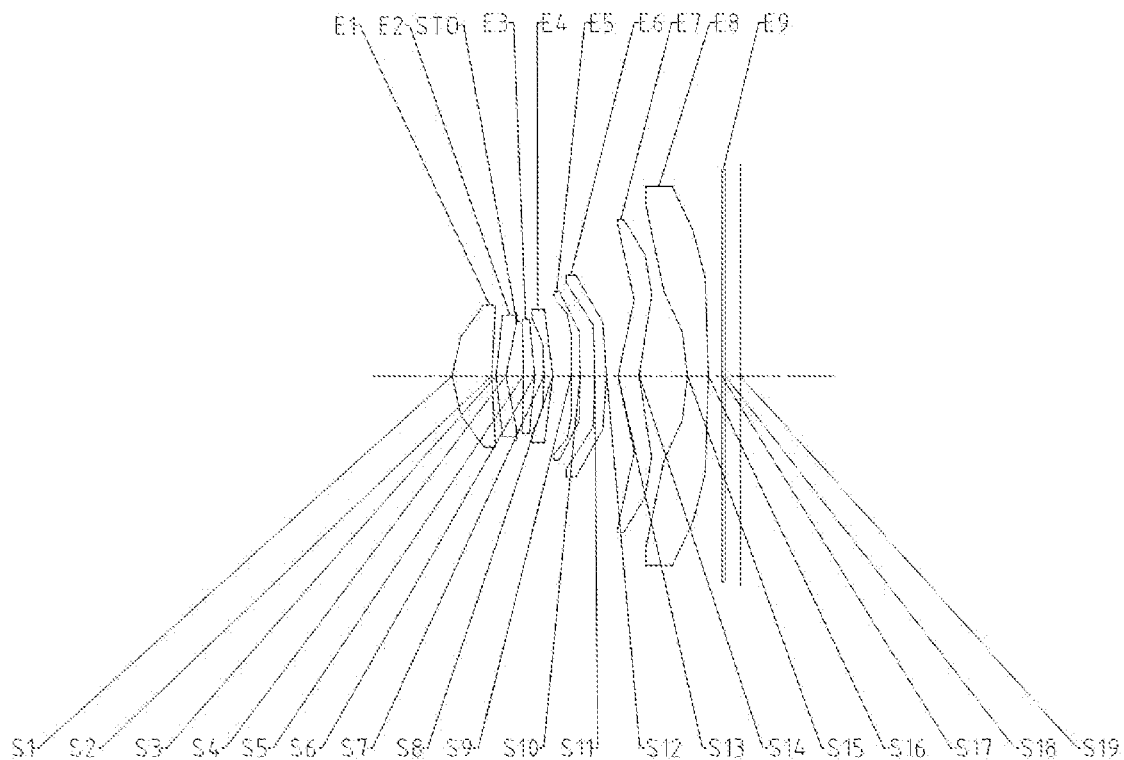
FIG. 7 shows a structural schematic diagram of an optical imaging lens assembly according to Embodiment 4 of the disclosure.

An optical imaging lens according to Embodiment 4 of the disclosure is described below with reference to FIGS. 7-8D. FIG. 7 shows a structural schematic diagram of an optical imaging lens assembly according to Embodiment 4 of the disclosure.

As shown in FIG. 7, the optical imaging lens assembly sequentially includes, from an object side to an image side, a first lens E1, a second lens E2, a diaphragm STO, a third lens E3, a fourth lens E4, a fifth lens E5, a sixth lens E6, a seventh lens E7, an eighth lens E8, an optical filter E9 and an imaging surface S19.

The first lens E1 has a positive refractive power, an object-side surface S1 thereof is a convex surface, and an image-side surface S2 thereof is a concave surface. The second lens E2 has a negative refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a convex surface. The fourth lens E4 has a negative refractive power, an object-side surface S7 thereof is a concave surface, and an image-side surface S8 thereof is a concave surface. The fifth lens E5 has a negative refractive power, an object-side surface S9 thereof is a convex surface, and an image-side surface S10 thereof is a concave surface. The sixth lens E6 has a negative refractive power, an object-side surface S11 thereof is a convex surface, and an image-side surface S12 thereof is a concave surface. The seventh lens E7 has a positive refractive power, an object-side surface S13 thereof is a convex surface, and an image-side surface S14 thereof is a concave surface. The eighth lens E8 has a negative refractive power, an object-side surface S15 thereof is a concave surface, and an image-side surface S16 thereof is a concave surface. The optical filter E9 has an object-side surface S17 and an image-side surface S18. Light from an object sequentially penetrates through each of the surfaces S1 to S18 and is finally imaged on the imaging surface S19.

In the embodiment, a total effective focal length f of the optical imaging lens is 7.60 mm. TTL is a total length of the optical imaging lens, and TTL is 8.94 mm. ImgH is a half of a diagonal length of an effective pixel region on the imaging surface S19 of the optical imaging lens assembly, and ImgH is 6.60 mm. Semi-FOV is a half of a maximum field of view of the optical imaging lens assembly, and Semi-FOV is 39.3°. Fno is an f-number of the optical imaging lens assembly, and Fno is 1.90.

Table 7 shows a basic parameter table of the optical imaging lens assembly of Embodiment 4, wherein the units of the curvature radius, the thickness/distance and the focal length are all millimeters (mm). Tables 8-1 and 8-2 show high-order coefficients applied to each aspheric mirror surface in Embodiment 4. A surface type of each aspheric surface may be defined by formula (1) given in Embodiment 1.

TABLE 7

| Surface number | Surface type | Curvature radius | Thickness/ distance | Material Refractive index | Abbe number | Focal length | Conic coefficient |
| --- | --- | --- | --- | --- | --- | --- | --- |
| OBJ | Spherical | Infinite | Infinite | | | | |
| S1 | Aspheric | 2.9747 | 1.2295 | 1.55 | 56.1 | 6.68 | −0.9834 |
| S2 | Aspheric | 13.7315 | 0.1269 | | | | 23.4441 |
| S3 | Aspheric | 9.3406 | 0.3099 | 1.68 | 19.2 | −17.24 | 17.8716 |
| S4(STO) | Aspheric | 5.1256 | 0.5500 | | | | 2.6326 |
| S5 | Aspheric | 518.1047 | 0.3505 | 1.62 | 25.9 | 37.81 | 99.0000 |
| S6 | Aspheric | −24.5447 | 0.2839 | | | | −80.4378 |
| S7 | Aspheric | −169.0858 | 0.2773 | 1.68 | 19.2 | −25.59 | 99.0000 |
| S8 | Aspheric | 19.3722 | 0.5667 | | | | 80.8612 |
| S9 | Aspheric | 13.2615 | 0.2748 | 1.67 | 20.3 | −550.93 | 7.1690 |
| S10 | Aspheric | 12.6942 | 0.4602 | | | | 14.2402 |
| S11 | Aspheric | 13.0161 | 0.3614 | 1.57 | 37.4 | −29.32 | 4.1274 |
| S12 | Aspheric | 7.2478 | 0.3623 | | | | −99.0000 |
| S13 | Aspheric | 2.3732 | 0.6496 | 1.55 | 56.1 | 7.24 | −8.3384 |
| S14 | Aspheric | 5.3557 | 1.5088 | | | | −15.4804 |
| S15 | Aspheric | −10.0836 | 0.6403 | 1.55 | 56.1 | −6.82 | −1.7743 |
| S16 | Aspheric | 6.0512 | 0.4145 | | | | −19.8610 |
| S17 | Spherical | Infinite | 0.1100 | 1.52 | 64.2 | | |
| S18 | Spherical | Infinite | 0.4677 | | | | |
| S19 | Spherical | Infinite | | | | | |

TABLE 8-1

| Surface number | A4 | A6 | A8 | A10 | A12 | A14 | A16 |
| --- | --- | --- | --- | --- | --- | --- | --- |
| S1 | 1.4076E−01 | 1.6984E−03 | −2.9957E−03 | −1.2890E−03 | −4.3703E−04 | −1.3790E−04 | −5.5193E−05 |
| S2 | −7.5512E−02 | 9.0105E−03 | −6.0329E−03 | 9.6937E−04 | −4.9039E−04 | 7.8572E−05 | −1.4105E−05 |
| S3 | −7.4169E−02 | 2.1312E−02 | −6.7410E−03 | 1.3532E−03 | −4.8653E−04 | 2.0020E−04 | 1.2818E−04 |
| S4 | −1.5259E−03 | 1.8171E−02 | 5.1277E−04 | 1.2647E−04 | 1.1690E−04 | 1.2088E−05 | −1.2075E−05 |
| S5 | −6.4017E−02 | 9.2686E−03 | 2.6173E−03 | 1.0187E−03 | 1.0983E−04 | 1.0601E−04 | 5.4400E−06 |
| S6 | −1.2321E−01 | 6.7937E−03 | 1.1843E−03 | 4.4966E−04 | −1.6840E−04 | −2.1447E−05 | −1.2389E−04 |
| S7 | −3.7197E−01 | −9.5961E−03 | −6.1686E−03 | 1.9241E−04 | −1.9574E−04 | 3.3825E−04 | 2.9623E−05 |
| S8 | −5.0004E−01 | 1.4584E−02 | 3.9439E−03 | 6.8315E−03 | 9.3792E−04 | 1.5394E−05 | −1.0325E−03 |
| S9 | −1.0025E+00 | −2.9901E−02 | −1.3674E−02 | 2.7085E−02 | 7.3434E−03 | 3.5336E−03 | −3.7905E−04 |

TABLE 8-1-continued

| Surface number | A4 | A6 | A8 | A10 | A12 | A14 | A16 |
|---|---|---|---|---|---|---|---|
| S10 | −1.0110E+00 | 2.1036E−02 | −1.3496E−02 | 2.1590E−02 | 3.7689E−03 | 1.5097E−03 | −1.0857E−03 |
| S11 | −1.0370E+00 | −8.2695E−03 | −1.9032E−02 | 2.1646E−02 | 4.1752E−03 | 3.9718E−03 | 3.9188E−04 |
| S12 | −1.2844E+00 | 2.0498E−01 | −3.4222E−02 | 2.6973E−02 | −9.9939E−03 | 2.7908E−03 | −6.3407E−04 |
| S13 | −1.6121E+00 | 2.1143E−01 | 6.3729E−02 | −6.0455E−02 | 1.9066E−02 | 1.1381E−03 | −8.1273E−04 |
| S14 | −1.2743E+00 | −9.2547E−02 | 1.0710E−01 | −5.8581E−02 | 2.6834E−02 | −9.0090E−03 | 3.7341E−03 |
| S15 | −3.2286E−01 | 6.0341E−01 | −3.6919E−01 | 1.6672E−01 | −5.5356E−02 | 6.6602E−03 | −4.8826E−04 |
| S16 | −2.2755E+00 | 6.8458E−01 | −2.5317E−01 | 7.0780E−02 | −2.3257E−02 | 1.1655E−02 | −1.1029E−02 |

TABLE 8-2

| Surface number | A18 | A20 | A22 | A24 | A26 | A28 | A30 |
|---|---|---|---|---|---|---|---|
| S1 | −2.2842E−05 | −3.8401E−06 | 3.1925E−06 | −6.7730E−07 | −3.5176E−06 | 1.2313E−06 | −4.0532E−06 |
| S2 | 2.4317E−05 | 7.4880E−06 | 1.5095E−05 | 5.7506E−06 | 5.8477E−06 | 1.2734E−06 | 2.0322E−06 |
| S3 | 1.4833E−04 | 1.1160E−04 | 8.6450E−05 | 4.6384E−05 | 2.5737E−05 | 9.4725E−06 | 6.0121E−06 |
| S4 | −4.8105E−05 | −3.4483E−05 | −3.8121E−05 | −1.9929E−05 | −1.8952E−05 | −9.7020E−06 | −7.1469E−06 |
| S5 | 2.7800E−05 | −2.6956E−06 | 9.1816E−06 | −7.4629E−07 | 1.1451E−05 | 1.2064E−05 | 1.1220E−05 |
| S6 | −1.3254E−04 | −1.1496E−04 | −8.4570E−05 | −5.0170E−05 | −2.8838E−05 | −1.3129E−05 | −5.7562E−06 |
| S7 | −3.8017E−05 | −5.1039E−05 | −2.5231E−05 | 2.1671E−06 | 1.0696E−05 | 6.6088E−06 | 1.0446E−06 |
| S8 | −8.6281E−04 | −6.2514E−04 | −3.4959E−04 | −1.8099E−04 | −7.4925E−05 | −2.7992E−05 | −4.3217E−06 |
| S9 | −5.1095E−04 | −4.5580E−04 | −1.1069E−04 | 4.1700E−05 | 1.1290E−04 | 7.3648E−05 | 3.8713E−06 |
| S10 | −9.1221E−04 | −7.5819E−04 | −6.0739E−04 | −4.5721E−04 | −3.0818E−04 | −1.0105E−04 | −3.9222E−05 |
| S11 | −2.5078E−04 | −4.4176E−04 | −2.5296E−04 | 6.8965E−05 | 1.6395E−05 | 5.1296E−05 | −1.5701E−05 |
| S12 | 5.1980E−04 | −3.2643E−04 | 9.7609E−05 | −1.7740E−06 | 3.3997E−05 | −1.7605E−05 | −1.0529E−06 |
| S13 | −3.0564E−03 | 1.4996E−03 | 2.9796E−04 | 6.9080E−05 | −1.3548E−04 | −7.9258E−06 | 1.5018E−05 |
| S14 | −1.9136E−03 | −1.6977E−05 | −5.9558E−04 | 8.6675E−05 | 2.3592E−04 | −2.1654E−05 | 6.8684E−05 |
| S15 | 4.5020E−03 | −4.5793E−03 | 2.3327E−03 | −7.7371E−04 | −1.5620E−04 | 2.6551E−04 | −8.5724E−05 |
| S16 | 5.7977E−03 | −2.3088E−03 | 8.6040E−04 | 2.8109E−04 | −2.0021E−04 | −9.2736E−05 | 3.8147E−05 |

Figure 8A:
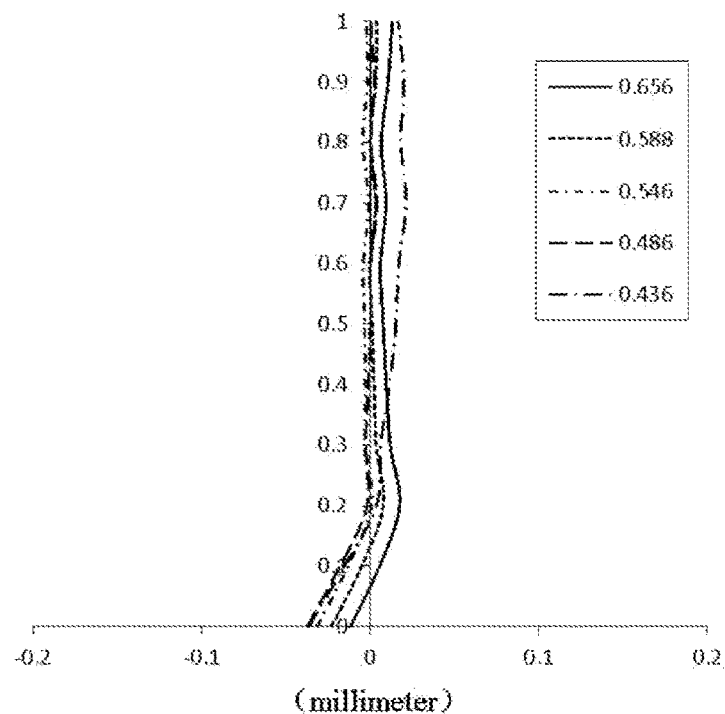
FIGS. 8A-8D show a longitudinal aberration curve, an astigmatism curve, a distortion curve, and a lateral color curve of an optical imaging lens assembly according to Embodiment 4 respectively.
Figure 8B:
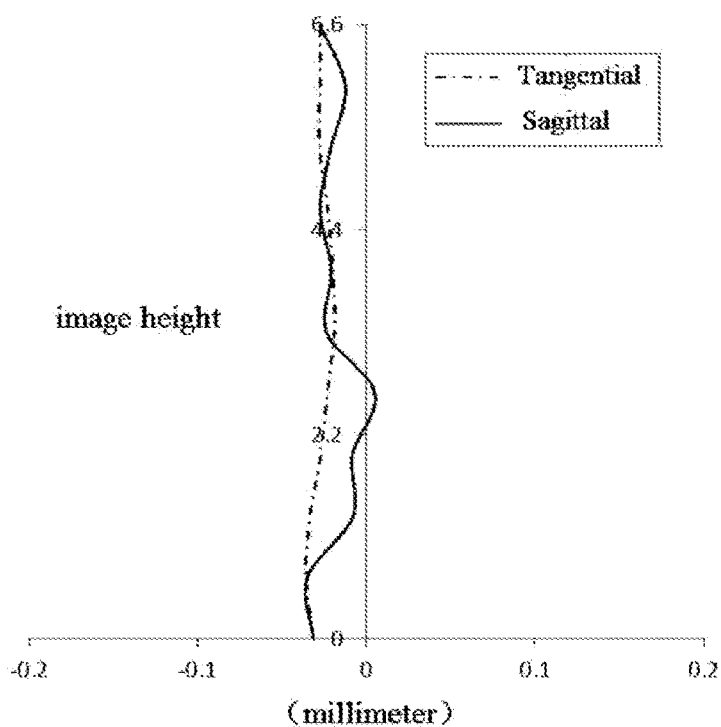
Figure 8C:
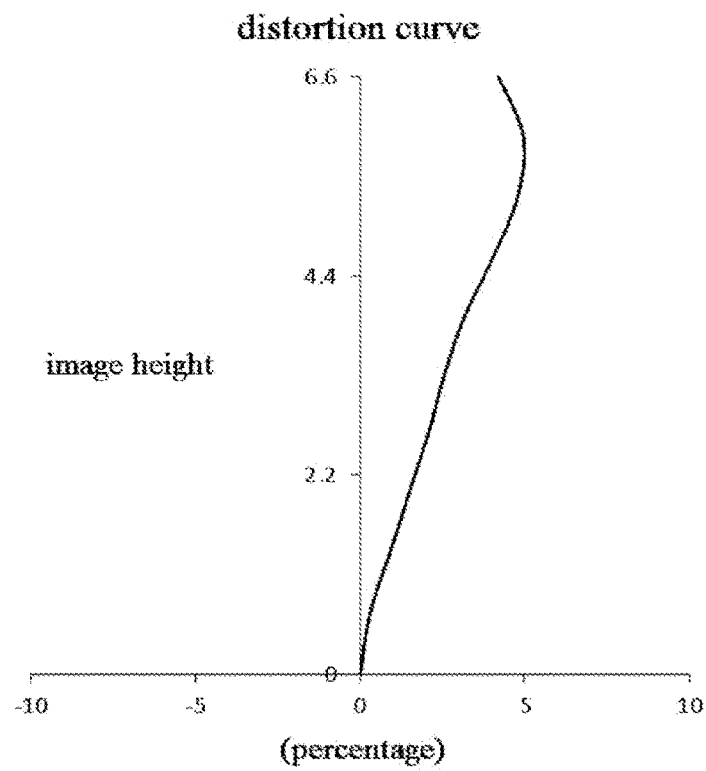
Figure 8D:
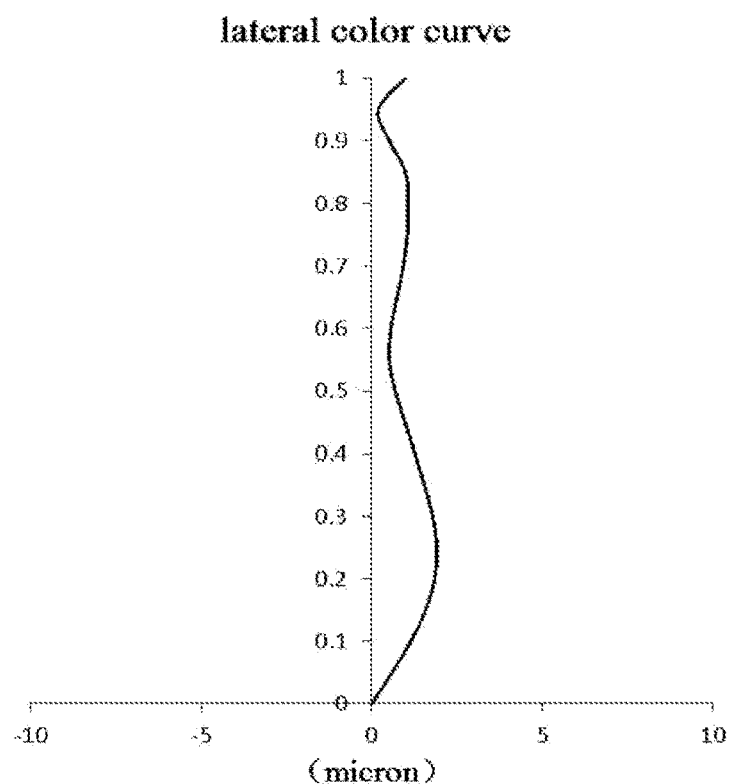

FIG. 8A shows a longitudinal aberration curve of the optical imaging lens assembly according to Embodiment 4 to represent deviation of a convergence focal point after light with different wavelengths passes through the lens assembly. FIG. 8B shows an astigmatism curve of the optical imaging lens assembly according to Embodiment 4 to represent a tangential image surface curvature and a sagittal image surface curvature. FIG. 8C shows a distortion curve of the optical imaging lens assembly according to Embodiment 4 to represent distortion values corresponding to different image heights. FIG. 8D shows a lateral color curve of the optical imaging lens assembly according to Embodiment 4 to represent deviation of different image heights on the imaging surface after the light passes through the lens assembly. According to FIGS. 8A-8D, it can be seen that the optical imaging lens assembly provided in Embodiment 4 may achieve high imaging quality.

Embodiment 5

Figure 9:
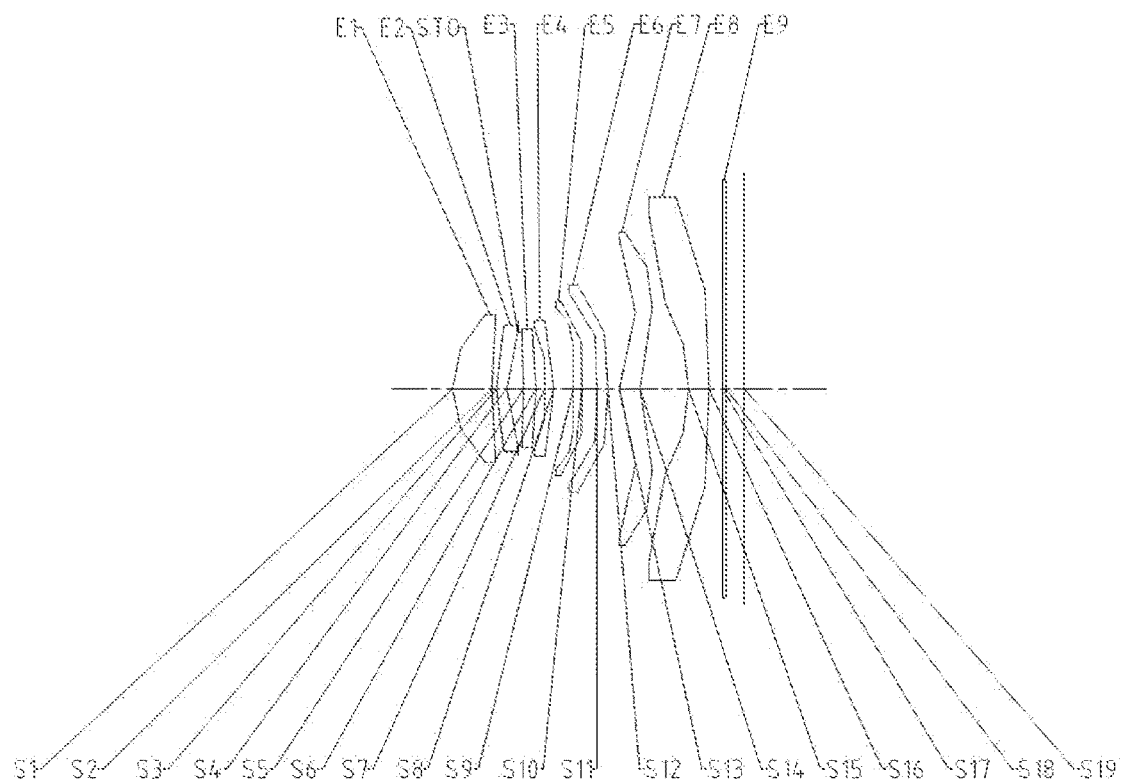
FIG. 9 shows a structural schematic diagram of an optical imaging lens assembly according to Embodiment 5 of the disclosure.

An optical imaging lens according to Embodiment 5 of the disclosure is described below with reference to FIGS. 9-10D. FIG. 9 shows a structural schematic diagram of an optical imaging lens assembly according to Embodiment 5 of the disclosure.

As shown in FIG. 9, the optical imaging lens assembly sequentially includes, from an object side to an image side, a first lens E1, a second lens E2, a diaphragm STO, a third lens E3, a fourth lens E4, a fifth lens E5, a sixth lens E6, a seventh lens E7, an eighth lens E8, an optical filter E9 and an imaging surface S19.

The first lens E1 has a positive refractive power, an object-side surface S1 thereof is a convex surface, and an image-side surface S2 thereof is a concave surface. The second lens E2 has a negative refractive power, an object-side surface S3 thereof is a convex surface, and an image-side surface S4 thereof is a concave surface. The third lens E3 has a negative refractive power, an object-side surface S5 thereof is a convex surface, and an image-side surface S6 thereof is a concave surface. The fourth lens E4 has a negative refractive power, an object-side surface S7 thereof is a convex surface, and an image-side surface S8 thereof is a concave surface. The fifth lens E5 has a negative refractive power, an object-side surface S9 thereof is a convex surface, and an image-side surface S10 thereof is a concave surface. The sixth lens E6 has a negative refractive power, an object-side surface S11 thereof is a convex surface, and an image-side surface S12 thereof is a concave surface. The seventh lens E7 has a positive refractive power, an object-side surface S13 thereof is a convex surface, and an image-side surface S14 thereof is a concave surface. The eighth lens E8 has a negative refractive power, an object-side surface S15 thereof is a concave surface, and an image-side surface S16 thereof is a concave surface. The optical filter E9 has an object-side surface S17 and an image-side surface S18. Light from an object sequentially penetrates through each of the surfaces S1 to S18 and is finally imaged on the imaging surface S19.

In the embodiment, a total effective focal length f of the optical imaging lens is 7.77 mm. TTL is a total length of the optical imaging lens, and TTL is 9.08 mm. ImgH is a half of a diagonal length of an effective pixel region on the imaging surface S19 of the optical imaging lens assembly, and ImgH is 6.60 mm. Semi-FOV is a half of a maximum field of view of the optical imaging lens assembly, and Semi-FOV is 38.7°. Fno is an f-number of the optical imaging lens assembly, and Fno is 1.90.

Table 9 shows a basic parameter table of the optical imaging lens assembly of Embodiment 5, wherein the units of the curvature radius, the thickness/distance and the focal length are all millimeters (mm). Tables 10-1 and 10-2 show high-order coefficients applied to each aspheric mirror surface in Embodiment 5. A surface type of each aspheric surface may be defined by formula (1) given in Embodiment 1.

TABLE 9

| Surface number | Surface type | Curvature radius | Thickness/ distance | Material Refractive index | Material Abbe number | Focal length | Conic coefficient |
|---|---|---|---|---|---|---|---|
| OBJ | Spherical | Infinite | Infinite | | | | |
| S1 | Aspheric | 2.9789 | 1.2311 | 1.55 | 56.1 | 6.67 | −0.9781 |
| S2 | Aspheric | 13.8794 | 0.1451 | | | | 22.1925 |
| S3 | Aspheric | 9.3966 | 0.3172 | 1.68 | 19.2 | −17.70 | 17.8923 |
| S4(STO) | Aspheric | 5.2006 | 0.5291 | | | | 2.7031 |
| S5 | Aspheric | 6945.2552 | 0.3737 | 1.62 | 25.9 | −332.14 | 99.0000 |
| S6 | Aspheric | 200.0000 | 0.2760 | | | | 97.9534 |
| S7 | Aspheric | 25.1066 | 0.2944 | 1.68 | 19.2 | −123.19 | −96.2247 |
| S8 | Aspheric | 19.2182 | 0.6048 | | | | 78.6679 |
| S9 | Aspheric | 13.1802 | 0.2644 | 1.67 | 20.3 | −249.55 | 6.9165 |
| S10 | Aspheric | 12.1168 | 0.4620 | | | | 13.2851 |
| S11 | Aspheric | 12.6744 | 0.3473 | 1.57 | 37.4 | −21.89 | 5.5481 |
| S12 | Aspheric | 6.2297 | 0.3586 | | | | −99.0000 |
| S13 | Aspheric | 2.2470 | 0.6411 | 1.55 | 56.1 | 7.00 | −8.3191 |
| S14 | Aspheric | 4.8928 | 1.5149 | | | | −16.3669 |
| S15 | Aspheric | −9.7341 | 0.6473 | 1.55 | 56.1 | −7.54 | −2.4623 |
| S16 | Aspheric | 7.3124 | 0.4145 | | | | −23.8045 |
| S17 | Spherical | Infinite | 0.1100 | 1.52 | 64.2 | | |
| S18 | Spherical | Infinite | 0.5509 | | | | |
| S19 | Spherical | Infinite | | | | | |

TABLE 10-1

| Surface number | A4 | A6 | A8 | A10 | A12 | A14 | A16 |
|---|---|---|---|---|---|---|---|
| S1 | 1.4137E−01 | 3.3447E−03 | −1.9457E−03 | −8.3802E−04 | −2.5723E−04 | −7.8656E−05 | −2.2690E−05 |
| S2 | −7.9692E−02 | 1.0285E−02 | −4.9713E−03 | 9.9400E−04 | −3.9074E−04 | 3.7009E−05 | −1.8501E−05 |
| S3 | −7.3612E−02 | 2.1082E−02 | −6.4225E−03 | 1.2393E−03 | −6.0562E−04 | 1.1601E−05 | −2.0405E−05 |
| S4 | −4.7276E−04 | 1.8390E−02 | 3.4684E−04 | 1.4891E−03 | 1.8614E−04 | 1.0178E−04 | 2.8068E−05 |
| S5 | −6.4258E−02 | 9.1550E−03 | 2.2476E−03 | 8.8553E−04 | 1.7078E−04 | 5.6397E−05 | 2.8227E−05 |
| S6 | −1.2312E−01 | 7.9193E−03 | 2.0263E−04 | 4.3181E−04 | −1.8451E−04 | 6.1807E−05 | 2.6674E−06 |
| S7 | −3.7198E−01 | −9.0808E−03 | −6.1898E−03 | 4.3063E−04 | −6.9226E−04 | 3.5024E−04 | −3.5343E−05 |
| S8 | −5.0194E−01 | 1.2637E−02 | 5.2806E−03 | 6.5256E−03 | 9.3813E−04 | 1.3871E−04 | −9.9289E−04 |
| S9 | −1.0076E+00 | −2.1940E−02 | −1.5309E−02 | 2.5791E−02 | 7.6512E−03 | 4.0649E−03 | −2.4684E−04 |
| S10 | −1.0090E+00 | 1.4900E−02 | −1.2424E−02 | 2.2433E−02 | 4.4522E−03 | 1.2657E−03 | −1.2749E−03 |
| S11 | −1.0316E+00 | −6.6662E−03 | −2.0352E−02 | 2.1708E−02 | 4.2109E−03 | 3.9953E−03 | 3.7737E−04 |
| S12 | −1.2792E+00 | 2.0381E−01 | −3.1071E−02 | 2.5936E−02 | −9.6353E−03 | 2.8450E−03 | −5.1742E−04 |
| S13 | −1.6523E+00 | 2.1639E−01 | 6.6693E−02 | −5.9612E−02 | 1.8932E−02 | 2.0930E−04 | −6.5054E−04 |
| S14 | −1.3238E+00 | −1.0387E−01 | 1.0271E−01 | −5.7492E−02 | 2.6624E−02 | −8.3790E−03 | 3.4972E−03 |
| S15 | −2.6550E−01 | 5.8042E−01 | −3.7368E−01 | 1.6515E−01 | −5.4678E−02 | 7.4890E−03 | −7.7686E−04 |
| S16 | −2.1384E+00 | 6.7898E−01 | −2.5309E−01 | 6.8765E−02 | −2.2771E−02 | 1.2342E−02 | −1.1074E−02 |

TABLE 10-2

| Surface number | A18 | A20 | A22 | A24 | A26 | A28 | A30 |
|---|---|---|---|---|---|---|---|
| S1 | −1.0490E−05 | −7.7614E−06 | −2.4548E−06 | 4.6720E−06 | 4.3076E−06 | 1.0757E−06 | −4.3406E−06 |
| S2 | −6.5741E−06 | 2.7379E−06 | −6.4392E−06 | 4.7914E−06 | 1.2725E−06 | 3.0307E−06 | −2.7341E−06 |
| S3 | 1.2075E−05 | 2.2461E−05 | 2.0712E−05 | 2.1456E−05 | 1.8995E−05 | 1.4770E−05 | 4.3393E−06 |
| S4 | 2.5751E−06 | 5.0293E−06 | 1.9926E−06 | 4.8660E−06 | −2.6555E−06 | −1.0305E−05 | −2.6155E−06 |
| S5 | 8.5414E−06 | 4.9124E−06 | −6.8834E−06 | −3.6317E−06 | −1.9123E−06 | 3.1155E−06 | 4.4350E−06 |
| S6 | −6.5349E−06 | −1.7120E−05 | −1.3384E−05 | −3.0199E−06 | 3.1694E−06 | −3.4906E−06 | −3.6142E−06 |
| S7 | 6.9969E−05 | −6.5015E−05 | 1.1341E−05 | −2.3245E−05 | 2.0569E−05 | 1.8396E−06 | 1.0557E−05 |
| S8 | −9.0016E−04 | −7.0921E−04 | −4.0615E−04 | −2.3347E−04 | −1.0488E−04 | −4.4045E−05 | −1.1823E−05 |
| S9 | −8.0611E−04 | −6.1471E−04 | −1.0773E−04 | 1.6011E−04 | 2.1972E−04 | 1.4393E−04 | 4.2020E−05 |
| S10 | −1.3521E−03 | −9.1229E−04 | −6.9344E−04 | −4.0845E−04 | −2.9602E−04 | −8.9730E−05 | −4.7524E−05 |
| S11 | −2.5234E−04 | −4.4304E−04 | −2.5332E−04 | 6.9529E−06 | 1.6447E−05 | 5.1350E−05 | −1.5688E−05 |
| S12 | 5.2477E−04 | −3.2442E−04 | 9.4984E−05 | −2.4248E−06 | 3.3029E−05 | −1.8452E−05 | −1.3058E−06 |
| S13 | −2.2546E−04 | 1.4849E−03 | 3.1459E−04 | 1.3456E−04 | −2.2915E−04 | −8.9238E−05 | 8.8202E−06 |
| S14 | −1.0860E−04 | 9.7962E−05 | −2.9625E−04 | 4.8758E−04 | 4.7567E−04 | 1.0068E−04 | 1.0302E−04 |
| S15 | 4.3579E−03 | −4.7339E−03 | 2.3782E−03 | −8.0475E−04 | −2.1916E−04 | 2.4428E−04 | −8.0800E−05 |
| S16 | 5.9020E−03 | −2.3208E−03 | 8.5315E−04 | 2.7230E−04 | −2.0432E−04 | −9.3681E−05 | 3.8471E−05 |

Figure 10A:
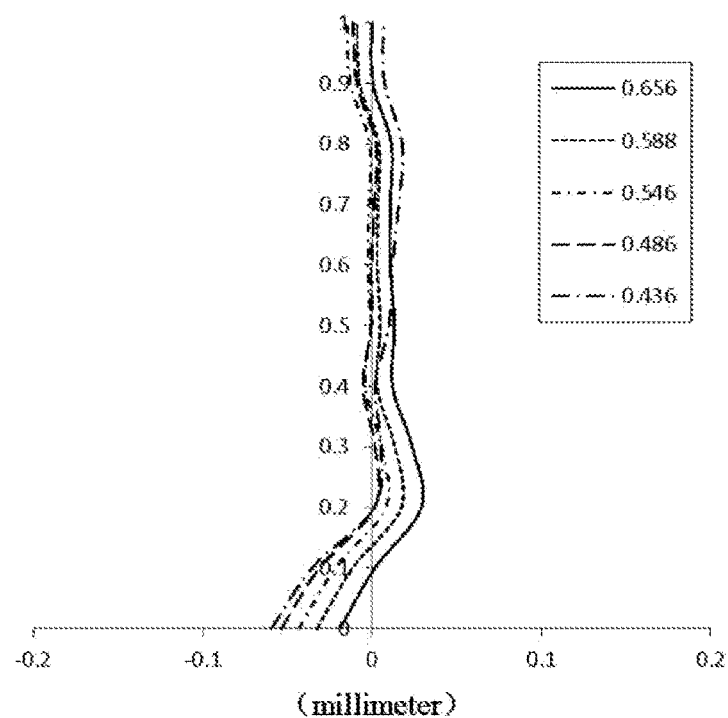
FIGS. 10A-10D show a longitudinal aberration curve, an astigmatism curve, a distortion curve, and a lateral color curve of an optical imaging lens assembly according to Embodiment 5 respectively.
Figure 10B:
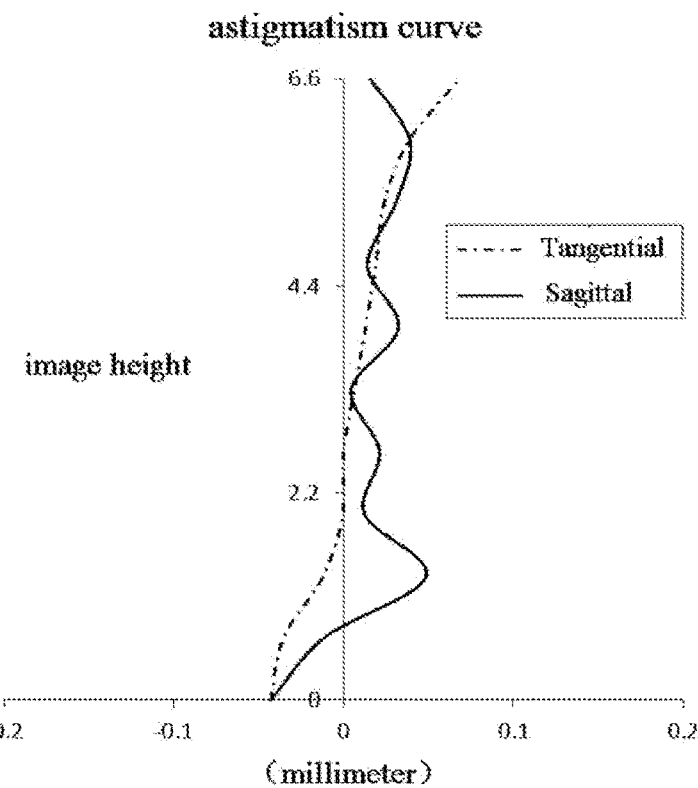
Figure 10C:
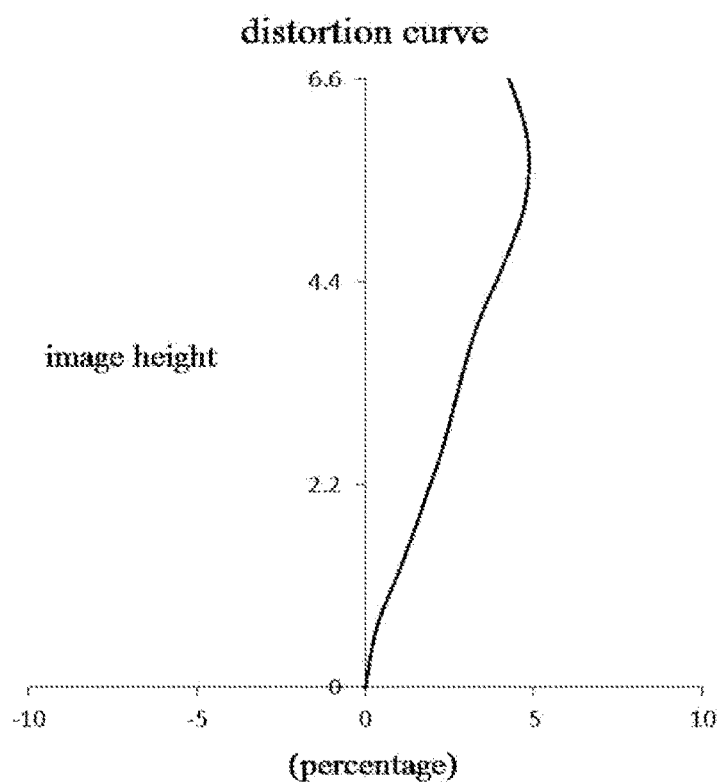
Figure 10D:
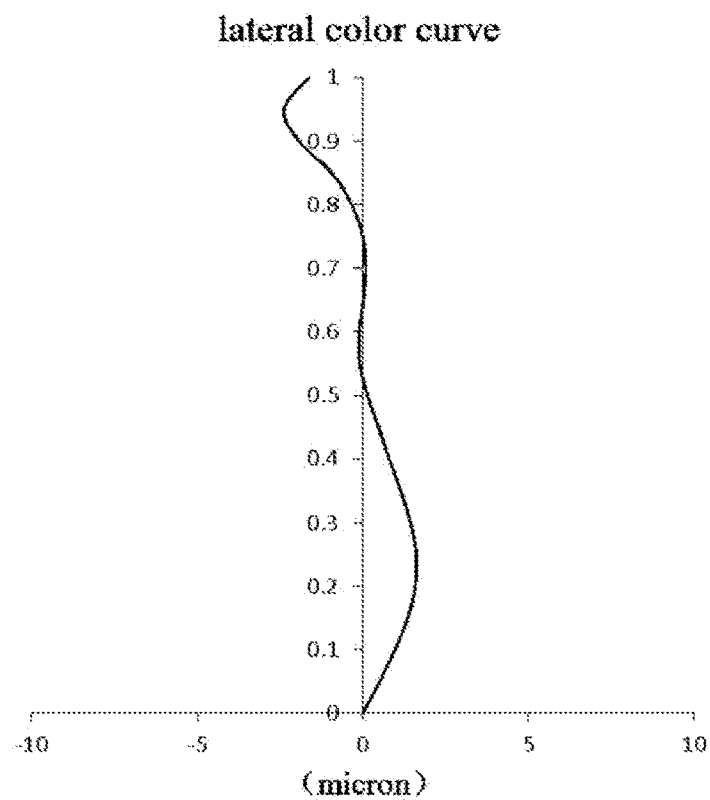

FIG. 10A shows a longitudinal aberration curve of the optical imaging lens assembly according to Embodiment 5 to represent deviation of a convergence focal point after light with different wavelengths passes through the lens assembly. FIG. 10B shows an astigmatism curve of the optical imaging lens assembly according to Embodiment 5 to represent a tangential image surface curvature and a sagittal image surface curvature. FIG. 10O shows a distortion curve of the optical imaging lens assembly according to Embodiment 5 to represent distortion values corresponding to different image heights. FIG. 10D shows a lateral color curve of the optical imaging lens assembly according to Embodiment 5 to represent deviation of different image heights on the imaging surface after the light passes through the lens assembly. According to FIGS. 10A-10D, it can be seen that the optical imaging lens assembly provided in Embodiment 5 may achieve high imaging quality.

Embodiment 6

Figure 11:
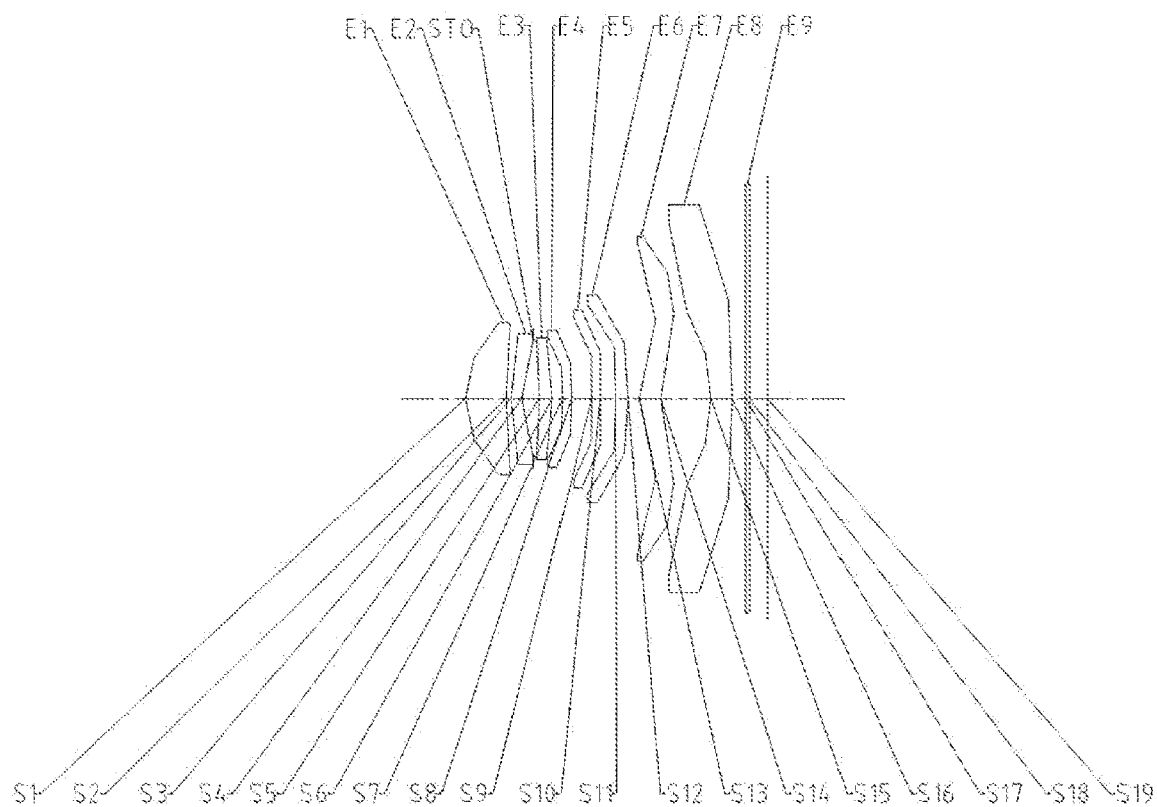
FIG. 11 shows a structural schematic diagram of an optical imaging lens assembly according to Embodiment 6 of the disclosure.

An optical imaging lens according to Embodiment 6 of the disclosure is described below with reference to FIGS. 11-12D. FIG. 11 shows a structural schematic diagram of an optical imaging lens assembly according to Embodiment 6 of the disclosure.

As shown in FIG. 11, the optical imaging lens assembly sequentially includes, from an object side to an image side, a first lens E1, a second lens E2, a diaphragm STO, a third lens E3, a fourth lens E4, a fifth lens E5, a sixth lens E6, a seventh lens E7, an eighth lens E8, an optical filter E9 and an imaging surface S19.

The first lens E1 has a positive refractive power, an object-side surface S1 thereof is a convex surface, and an image-side surface S2 thereof is a concave surface. The second lens E2 has a negative refractive power, an object-side surface S3 thereof is a convex surface, and an image-side surface S4 thereof is a concave surface. The third lens E3 has a positive refractive power, an object-side surface S5 thereof is a concave surface, and an image-side surface S6 thereof is a convex surface. The fourth lens E4 has a negative refractive power, an object-side surface S7 thereof is a concave surface, and an image-side surface S8 thereof is a convex surface. The fifth lens E5 has a negative refractive power, an object-side surface S9 thereof is a convex surface, and an image-side surface S10 thereof is a concave surface. The sixth lens E6 has a negative refractive power, an object-side surface S11 thereof is a convex surface, and an image-side surface S12 thereof is a concave surface. The seventh lens E7 has a positive refractive power, an object-side surface S13 thereof is a convex surface, and an image-side surface S14 thereof is a concave surface. The eighth lens E8 has a negative refractive power, an object-side surface S15 thereof is a concave surface, and an image-side surface S16 thereof is a concave surface. The optical filter E9 has an object-side surface S17 and an image-side surface S18. Light from an object sequentially penetrates through each of the surfaces S1 to S18 and is finally imaged on the imaging surface S19.

In the embodiment, a total effective focal length f of the optical imaging lens is 7.77 mm. TTL is a total length of the optical imaging lens, and TTL is 9.10 mm. ImgH is a half of a diagonal length of an effective pixel region on the imaging surface S19 of the optical imaging lens assembly, and ImgH is 6.60 mm. Semi-FOV is a half of a maximum field of view of the optical imaging lens assembly, and Semi-FOV is 38.5°. Fno is an f-number of the optical imaging lens assembly, and Fno is 1.90.

Table 11 shows a basic parameter table of the optical imaging lens assembly of Embodiment 6, wherein the units of the curvature radius, the thickness/distance and the focal length are all millimeters (mm). Tables 12-1 and 12-2 show high-order coefficients applied to each aspheric mirror surface in Embodiment 6. A surface type of each aspheric surface may be defined by formula (1) given in Embodiment 1.

TABLE 11

| Surface number | Surface type | Curvature radius | Thickness/ distance | Refractive index | Abbe number | Focal length | Conic coefficient |
|---|---|---|---|---|---|---|---|
| OBJ | Spherical | Infinite | Infinite | | | | |
| S1 | Aspheric | 2.9799 | 1.2324 | 1.55 | 56.1 | 6.67 | −0.9868 |
| S2 | Aspheric | 13.9237 | 0.1462 | | | | 22.5451 |
| S3 | Aspheric | 9.4292 | 0.3174 | 1.68 | 19.2 | −17.30 | 17.8385 |
| S4(STO) | Aspheric | 5.1585 | 0.5471 | | | | 2.7870 |
| S5 | Aspheric | −52.3310 | 0.3921 | 1.62 | 25.9 | 48.05 | 88.4707 |
| S6 | Aspheric | −19.0378 | 0.2915 | | | | −95.0176 |
| S7 | Aspheric | −23.9252 | 0.2678 | 1.68 | 19.2 | −43.24 | −10.4336 |
| S8 | Aspheric | −130.0000 | 0.6028 | | | | −99.0000 |
| S9 | Aspheric | 15.7059 | 0.2703 | 1.67 | 20.3 | −74.55 | −3.1502 |
| S10 | Aspheric | 11.8592 | 0.4554 | | | | 15.2483 |
| S11 | Aspheric | 12.8820 | 0.3688 | 1.57 | 37.4 | −30.53 | 5.3833 |
| S12 | Aspheric | 7.3294 | 0.3505 | | | | −98.5344 |
| S13 | Aspheric | 2.3822 | 0.6474 | 1.55 | 56.1 | 7.56 | −8.3739 |
| S14 | Aspheric | 5.0816 | 1.5119 | | | | −15.9607 |
| S15 | Aspheric | −9.6359 | 0.6395 | 1.55 | 56.1 | −7.06 | −2.4257 |
| S16 | Aspheric | 6.5802 | 0.4145 | | | | −26.8333 |
| S17 | Spherical | Infinite | 0.1100 | 1.52 | 64.2 | | |
| S18 | Spherical | Infinite | 0.5357 | | | | |
| S19 | Spherical | Infinite | | | | | |

TABLE 12-1

| Surface number | A4 | A6 | A8 | A10 | A12 | A14 | A16 |
|---|---|---|---|---|---|---|---|
| S1 | 1.4036E−01 | 3.7427E−03 | −2.6126E−03 | −8.5055E−04 | −4.6609E−04 | −1.1275E−04 | −1.0001E−04 |
| S2 | −7.8141E−02 | 9.4048E−03 | −5.2632E−03 | 7.5666E−04 | −5.1513E−04 | 8.0108E−05 | −1.6664E−05 |
| S3 | −7.4896E−02 | 2.1261E−02 | −6.4941E−03 | 1.0511E−03 | −6.0201E−04 | 6.5512E−05 | −2.1642E−05 |
| S4 | 5.8007E−04 | 1.8721E−02 | 3.2909E−04 | 1.3956E−03 | 2.0012E−04 | 1.5465E−04 | 7.2379E−05 |
| S5 | −6.4935E−02 | 8.9505E−03 | 2.1190E−03 | 1.0977E−03 | 1.3932E−04 | 1.2458E−04 | 4.8094E−06 |
| S6 | −1.2199E−01 | 8.0092E−03 | 1.5202E−03 | 5.6816E−04 | 9.4130E−05 | 5.9961E−05 | 8.2090E−05 |

TABLE 12-1-continued

| Surface number | A4 | A6 | A8 | A10 | A12 | A14 | A16 |
|---|---|---|---|---|---|---|---|
| S7 | −3.7347E−01 | −1.0435E−02 | −6.5472E−03 | −1.3677E−04 | −6.7470E−04 | 3.0541E−04 | 1.5263E−04 |
| S8 | −4.9452E−01 | 1.3875E−02 | 4.9267E−03 | 6.9345E−03 | 7.3263E−04 | −2.9635E−05 | −1.1797E−03 |
| S9 | −1.0189E+00 | −3.5058E−02 | −1.2882E−02 | 2.6066E−02 | 7.6267E−03 | 3.8682E−03 | −5.8866E−04 |
| S10 | −1.0002E+00 | 2.1295E−02 | −1.2331E−02 | 2.2528E−02 | 3.4433E−03 | 1.7346E−03 | −1.0851E−03 |
| S11 | −1.0328E+00 | −6.8512E−03 | −2.0788E−02 | 2.1490E−02 | 4.1246E−03 | 3.9629E−03 | 3.7091E−04 |
| S12 | −1.2674E+00 | 2.0466E−01 | −3.0834E−02 | 2.5514E−02 | −9.9779E−03 | 2.6863E−03 | −5.7619E−04 |
| S13 | −1.6703E+00 | 2.1537E−01 | 6.7894E−02 | −5.6711E−02 | 1.9000E−02 | 8.0219E−04 | −1.0177E−03 |
| S14 | −1.2848E+00 | −1.0452E−01 | 1.0209E−01 | −6.1292E−02 | 2.4831E−02 | −9.8995E−03 | 3.6038E−03 |
| S15 | −2.8153E−01 | 5.7760E−01 | −3.7446E−01 | 1.6423E−01 | −5.4999E−02 | 6.9392E−03 | −6.7255E−04 |
| S16 | −2.1306E+00 | 6.7006E−01 | −2.5560E−01 | 6.9654E−02 | −2.2653E−02 | 1.2491E−02 | −1.1041E−02 |

TABLE 12-2

| Surface number | A18 | A20 | A22 | A24 | A26 | A28 | A30 |
|---|---|---|---|---|---|---|---|
| S1 | −1.8281E−05 | −2.4007E−05 | 1.1249E−05 | −9.7907E−07 | 8.5509E−06 | 2.9020E−07 | −4.3901E−06 |
| S2 | 1.6341E−05 | −7.9368E−06 | −5.1794E−06 | −4.2889E−06 | 8.4040E−06 | 1.5900E−06 | −2.9680E−06 |
| S3 | 1.6330E−05 | 3.9356E−05 | 4.4776E−05 | 3.8098E−05 | 1.6803E−05 | 4.7235E−06 | 2.8718E−06 |
| S4 | 2.3122E−05 | 7.9485E−06 | −1.1145E−05 | −1.0119E−05 | −1.6535E−05 | −1.4233E−05 | −1.0596E−05 |
| S5 | 3.9342E−05 | −8.3369E−06 | 1.2796E−05 | −7.7836E−06 | 1.2731E−06 | −5.5797E−06 | 6.0061E−06 |
| S6 | −4.6892E−05 | −3.1142E−05 | −7.0763E−05 | −4.4940E−05 | −5.0178E−05 | −2.5620E−05 | −2.1195E−05 |
| S7 | 1.4521E−04 | 5.8312E−05 | 7.9501E−05 | 6.0612E−05 | 4.7855E−05 | 1.8771E−05 | 9.9515E−06 |
| S8 | −9.4018E−04 | −6.4604E−04 | −2.7562E−04 | −1.2845E−04 | −3.1634E−05 | −8.9554E−06 | 1.0674E−05 |
| S9 | −8.9275E−04 | −3.9695E−04 | 7.3821E−05 | 2.0566E−04 | 1.0738E−04 | 4.2545E−05 | −3.3541E−05 |
| S10 | −9.8640E−04 | −5.7821E−04 | −2.9580E−04 | −7.6644E−05 | −7.2028E−05 | 3.4375E−05 | −6.9877E−06 |
| S11 | −2.5510E−04 | −4.4340E−04 | −2.5371E−04 | 6.9018E−06 | 6.6495E−05 | 5.1263E−05 | −1.5730E−05 |
| S12 | 5.2535E−04 | −3.2253E−04 | 9.4180E−05 | −2.8156E−05 | 3.1446E−05 | −1.8066E−05 | −1.6511E−06 |
| S13 | −2.6054E−03 | 1.5750E−03 | 2.9820E−04 | −1.0463E−04 | −2.4429E−04 | −3.7054E−05 | 7.2355E−05 |
| S14 | −1.8113E−03 | 5.1023E−05 | −6.3784E−04 | 1.0121E−04 | 1.7278E−04 | −6.6410E−05 | 4.6402E−05 |
| S15 | 4.3650E−03 | −4.8401E−03 | 2.3057E−03 | −8.5248E−04 | −2.1589E−04 | 2.8459E−04 | −1.0287E−04 |
| S16 | 5.9269E−03 | −2.3134E−03 | 8.5838E−04 | 2.7554E−04 | −2.0320E−04 | −9.3275E−05 | 3.8936E−05 |

Figure 12A:
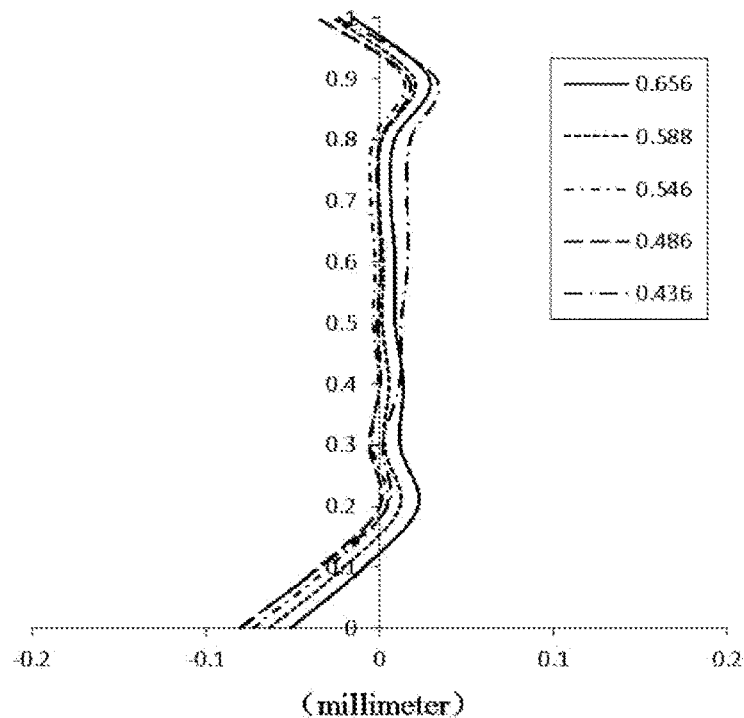
FIGS. 12A-12D show a longitudinal aberration curve, an astigmatism curve, a distortion curve and a lateral color curve of an optical imaging lens according to Embodiment 6 respectively.
Figure 12B:
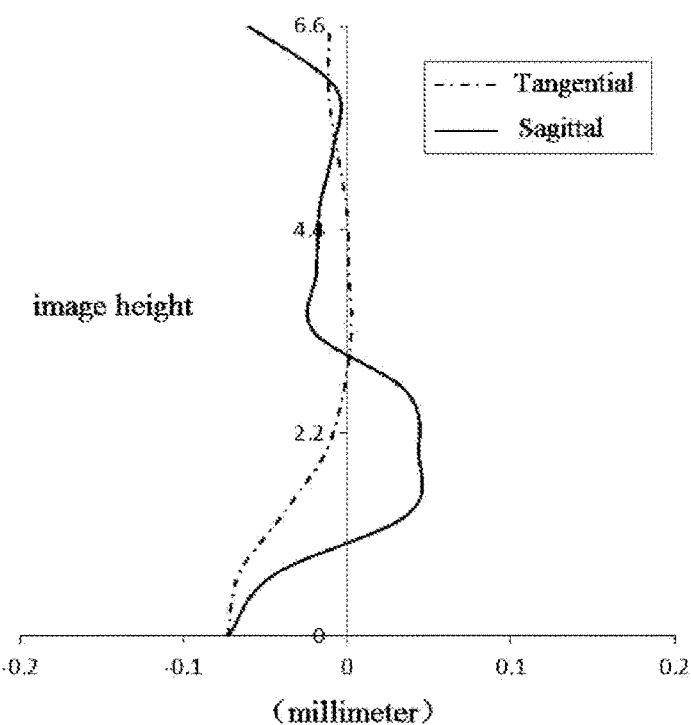
Figure 12C:
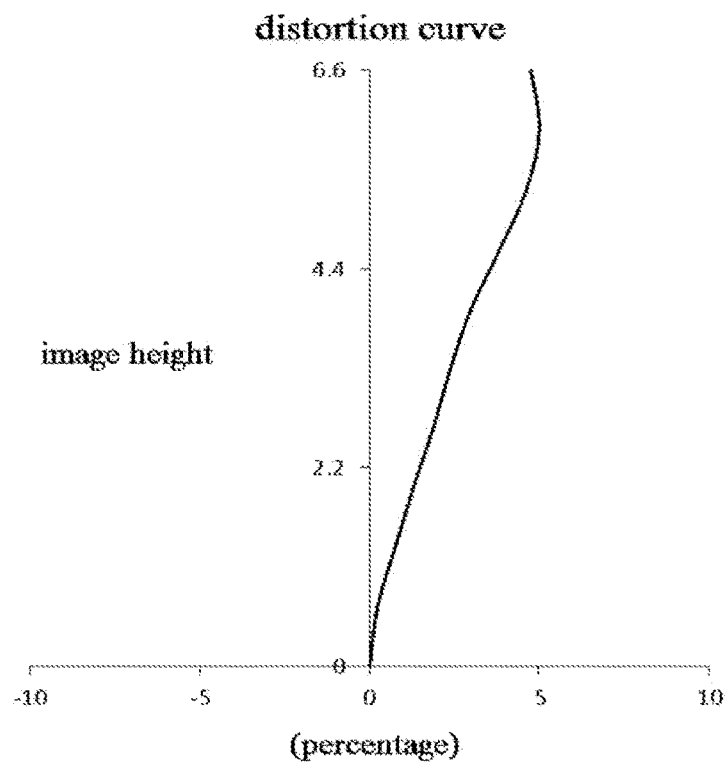
Figure 12D:
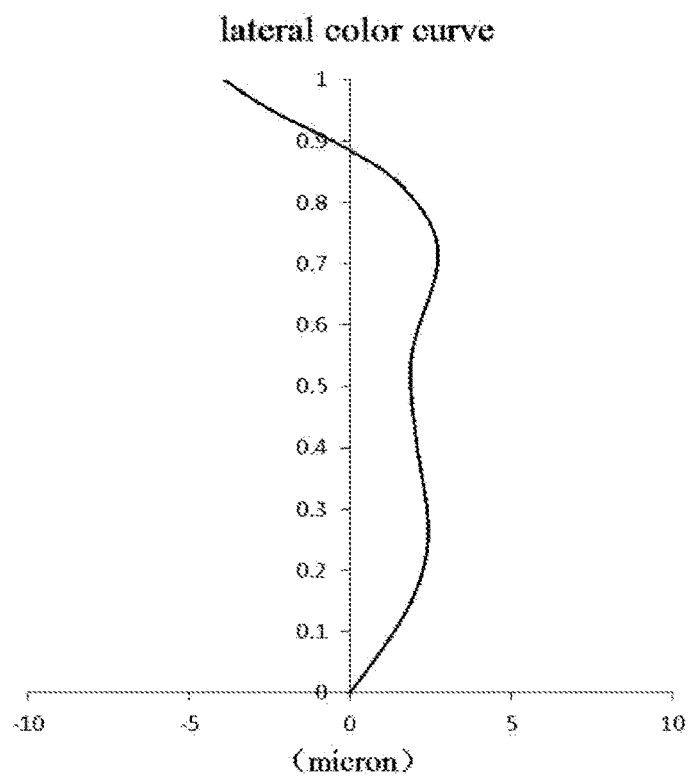

FIG. 12A shows a longitudinal aberration curve of the optical imaging lens assembly according to Embodiment 6 to represent deviation of a convergence focal point after light with different wavelengths passes through the lens assembly. FIG. 12B shows an astigmatism curve of the optical imaging lens assembly according to Embodiment 6 to represent a tangential image surface curvature and a sagittal image surface curvature. FIG. 12C shows a distortion curve of the optical imaging lens assembly according to Embodiment 6 to represent distortion values corresponding to different image heights. FIG. 12D shows a lateral color curve of the optical imaging lens assembly according to Embodiment 6 to represent deviation of different image heights on the imaging surface after the light passes through the lens assembly. According to FIGS. 12A-12D, it can be seen that the optical imaging lens assembly provided in Embodiment 6 may achieve high imaging quality.

From the above, Embodiment 1 to Embodiment 6 satisfy a relationship shown in Table 13 respectively.

TABLE 13

| Conditional expression | Embodiment | | | | | |
|---|---|---|---|---|---|---|
| | 1 | 2 | 3 | 4 | 5 | 6 |
| f/ImgH | 1.23 | 1.18 | 1.18 | 1.15 | 1.18 | 1.18 |
| f6/f1 | −4.44 | −3.25 | −1.44 | −4.39 | −3.28 | −4.58 |
| f/f7 | 1.03 | 1.11 | 1.53 | 1.05 | 1.11 | 1.03 |
| f/f8 | −1.23 | −1.03 | −1.45 | −1.11 | −1.03 | −1.10 |
| R2/R1 | 4.62 | 4.65 | 4.32 | 4.62 | 4.66 | 4.67 |
| V3/(R3 + R4)(mm⁻¹) | 1.79 | 1.76 | 1.43 | 1.79 | 1.78 | 1.78 |
| (R9 + R10)/V5(mm) | 1.27 | 1.23 | 1.15 | 1.27 | 1.24 | 1.35 |
| V6/(R11 + R12 × N6)(mm⁻¹) | 1.49 | 1.69 | 1.94 | 1.53 | 1.67 | 1.53 |
| (R14 + R13)/(R14 − R13) | 2.64 | 2.74 | 2.03 | 2.59 | 2.70 | 2.77 |
| R15/R16 | −1.47 | −1.28 | −2.36 | −1.67 | −1.33 | −1.46 |

TABLE 13-continued

| Conditional expression | Embodiment | | | | | |
|---|---|---|---|---|---|---|
| | 1 | 2 | 3 | 4 | 5 | 6 |
| T78/T45 | 2.38 | 2.53 | 3.50 | 2.66 | 2.50 | 2.51 |
| CT1/CT8 | 1.98 | 1.89 | 1.38 | 1.92 | 1.90 | 1.93 |
| T78/T67 | 4.31 | 4.29 | 3.96 | 4.16 | 4.22 | 4.31 |
| T78/CT8 | 2.40 | 2.33 | 1.91 | 2.36 | 2.34 | 2.36 |
| CT1/T12 | 8.65 | 8.60 | 8.17 | 9.69 | 8.49 | 8.43 |

The disclosure also provides an imaging device, of which an electronic photosensitive element may be a Charge-Coupled Device (CCD) or a Complementary Metal Oxide Semiconductor (CMOS). The imaging device may be an independent imaging device such as a digital camera, or may be an imaging module integrated into a mobile electronic device such as a mobile phone. The imaging device is provided with the above-mentioned optical imaging lens assembly.

The above description is only description about the preferred embodiments of the disclosure and adopted technical principles. It is understood by those skilled in the art that the scope of invention involved in the disclosure is not limited to the technical solutions formed by specifically combining the technical characteristics and should also cover other technical solutions formed by freely combining the technical characteristics or equivalent characteristics thereof without departing from the inventive concept, for example, technical solutions formed by mutually replacing the characteristics and (but not limited to) the technical characteristics with similar functions disclosed in the disclosure.

What is claimed is:

1. An optical imaging lens assembly, sequentially comprising from an object side to an image side along an optical axis: a first lens, a second lens, a third lens, a fourth lens, a fifth lens, a sixth lens, a seventh lens and an eighth lens with refractive power respectively, wherein, each of the fourth lens, the fifth lens and the sixth lens has negative refractive power;

a total effective focal length f of the optical imaging lens assembly satisfies f>7.5 mm; and a curvature radius R11 of an object-side surface of the sixth lens, a curvature radius R12 of an image-side surface of the sixth lens, a refractive index N6 of the sixth lens and an abbe number V6 of the sixth lens satisfy 1.0 mm−1<V6/(R11+R12×N6)<2.0 mm−1.

2. The optical imaging lens assembly according to claim 1, wherein an effective focal length f1 of the first lens and an effective focal length f6 of the sixth lens satisfy −5.0<f6/f1<−1.0.

3. The optical imaging lens assembly according to claim 1, wherein the total effective focal length f of the optical imaging lens assembly and an effective focal length f7 of the seventh lens satisfy 1.0<f/f7<2.0.

4. The optical imaging lens assembly according to claim 1, wherein the total effective focal length f of the optical imaging lens assembly and an effective focal length f8 of the eighth lens satisfy −1.5<f/f8<−1.0.

5. The optical imaging lens assembly according to claim 1, wherein a curvature radius R1 of an object-side surface of the first lens and a curvature radius R2 of an image-side surface of the first lens satisfy 4.0<R2/R1<5.0.

6. The optical imaging lens assembly according to claim 1, wherein a curvature radius R3 of an object-side surface of the second lens, a curvature radius R4 of an image-side surface of the second lens and an abbe number V3 of the third lens satisfy 1.0 mm−1<V3/(R3+R4)<2.0 mm−1.

7. The optical imaging lens assembly according to claim 1, wherein a curvature radius R9 of an object-side surface of the fifth lens, a curvature radius R10 of an image-side surface of the fifth lens and an abbe number V5 of the fifth lens satisfy 1.0 mm<(R9+R10)/V5<1.5 mm.

8. The optical imaging lens assembly according to claim 1, wherein a curvature radius R13 of an object-side surface of the seventh lens and a curvature radius R14 of an image-side surface of the seventh lens satisfy 2.0<(R14+R13)/(R14−R13)<3.0.

9. The optical imaging lens assembly according to claim 1, wherein a curvature radius R15 of an object-side surface of the eighth lens and a curvature radius R16 of an image-side surface of the eighth lens satisfy −2.5<R15/R16<−1.0.

10. The optical imaging lens assembly according to claim 1, wherein a spacing distance T23 of the second lens and the third lens on the optical axis and a spacing distance T67 of the sixth lens and the seventh lens on the optical axis satisfy T23>T67.

11. The optical imaging lens assembly according to claim 1, wherein a spacing distance T45 of the fourth lens and the fifth lens on the optical axis and a spacing distance T78 of the seventh lens and the eighth lens on the optical axis satisfy 2.0<T78/T45<3.6.

12. The optical imaging lens assembly according to claim 1, wherein a center thickness CT1 of the first lens on the optical axis and a center thickness CT8 of the eighth lens on the optical axis satisfy 1.0<CT1/CT8<2.0.

13. The optical imaging lens assembly according to claim 1, wherein a spacing distance T78 of the seventh lens and the eighth lens on the optical axis and a spacing distance T67 of the sixth lens and the seventh lens on the optical axis satisfy 3.96≤T78/T67≤4.31.

14. The optical imaging lens assembly according to claim 1, wherein a spacing distance T78 of the seventh lens and the eighth lens on the optical axis and a center thickness CT8 of the eighth lens on the optical axis satisfy 1.91≤T78/CT8≤2.40.

15. The optical imaging lens assembly according to claim 1, wherein a center thickness CT1 of the first lens on the optical axis and a spacing distance T12 of the first lens and the second lens on the optical axis satisfy 8.17≤CT1/T12≤9.69.

16. The optical imaging lens assembly according to claim 1, wherein ImgH is a half of a diagonal length of an effective pixel region on an imaging surface of the optical imaging lens assembly, and ImgH and the total effective focal length f of the optical imaging lens assembly satisfies 1.0<f/ImgH<1.5.

17. An optical imaging lens assembly, sequentially comprising from an object side to an image side along an optical axis: a first lens, a second lens, a third lens, a fourth lens, a fifth lens, a sixth lens, a seventh lens and an eighth lens with refractive power respectively, wherein each of the fourth lens, the fifth lens and the sixth lens has negative refractive power;

a total effective focal length f of the optical imaging lens assembly satisfies f>7.5 mm; and a curvature radius R3 of an object-side surface of the second lens, a curvature radius R4 of an image-side surface of the second lens and an abbe number V3 of the third lens satisfy 1.0 mm−1<V3/(R3+R4)<2.0 mm−1; and the total effective focal length f of the optical imaging lens assembly and an effective focal length f7 of the seventh lens satisfy 1.0<f/f7<2.0.

18. The optical imaging lens assembly according to claim 17, wherein an effective focal length f1 of the first lens and an effective focal length f6 of the sixth lens satisfy −5.0<f6/f1<−1.0.

19. The optical imaging lens assembly according to claim 17, wherein the total effective focal length f of the optical imaging lens assembly and an effective focal length f8 of the eighth lens satisfy −1.5<f/f8<−1.0.

\* \* \* \* \*